United States Patent [19]
Mizoguchi et al.

[11] Patent Number: 6,084,555
[45] Date of Patent: Jul. 4, 2000

[54] SPECTACLE TYPE DISPLAY DEVICE

[75] Inventors: Motoshi Mizoguchi, Kanagawa; Masahiko Ito, Tokyo; Miki Yonehara, Kanagawa, all of Japan

[73] Assignee: Sony Corporation, Tokyo, Japan

[21] Appl. No.: 08/240,554

[22] Filed: May 11, 1994

[30] Foreign Application Priority Data

May 24, 1993 [JP] Japan ................................. 5-121333

[51] Int. Cl.⁷ .................................................. G09G 5/00
[52] U.S. Cl. ............................................... 345/8; 359/630
[58] Field of Search .............................. 348/42, 48, 53; 359/630, 633, 631, 462, 473; 345/7, 8, 9; 83/726

[56] References Cited

U.S. PATENT DOCUMENTS

| | | | |
|---|---|---|---|
| 770,470 | 9/1904 | Mills | 40/455 |
| 2,955,156 | 10/1960 | Heilig | 348/42 |
| 3,376,381 | 4/1968 | Ratliff, Jr. | 348/48 |
| 3,945,716 | 3/1976 | Kinder | 345/7 |
| 4,021,846 | 5/1977 | Roese | 348/57 |
| 4,154,513 | 5/1979 | Goulden | 351/47 |
| 4,156,292 | 5/1979 | Helm et al. | 345/8 |
| 4,190,856 | 2/1980 | Ricks | 348/42 |
| 4,494,837 | 1/1985 | Bommarito | 351/204 |
| 4,550,984 | 11/1985 | Reymond | 359/409 |
| 4,559,555 | 12/1985 | Schoolman | 348/53 |
| 4,636,866 | 1/1987 | Hattori | 348/794 |
| 4,695,129 | 9/1987 | Faessen et al. | 385/119 |
| 4,706,117 | 11/1987 | Schoolman | 348/53 |
| 4,755,664 | 7/1988 | Holmes et al. | 250/214 VT |
| 4,933,755 | 6/1990 | Dahl et al. | 348/53 |

(List continued on next page.)

FOREIGN PATENT DOCUMENTS

| | | |
|---|---|---|
| 0077193 | 4/1983 | European Pat. Off. . |
| 0257409 | 3/1988 | European Pat. Off. . |
| 0403701 | 12/1990 | European Pat. Off. . |
| 0438362 | 7/1991 | European Pat. Off. . |
| 354738 | 10/1905 | France . |
| 3214872 | 9/1981 | Japan ................................. G09F 9/00 |
| 5048991 | 2/1993 | Japan ................................. G02B 7/02 |
| 591582 | 4/1993 | Japan . |
| 2123976 | 2/1984 | United Kingdom . |
| 2166887 | 5/1986 | United Kingdom . |
| 09104508 | 4/1991 | WIPO . |
| WO920792 | 4/1992 | WIPO ............................. G02B 27/22 |

OTHER PUBLICATIONS

Lindsay, "Physical Mechanics". Van Nostrand 1961 pp. 39–40, 411–412.

United States Statutory Invention Registration, Reg. No. H833, Published Nov. 6, 1990, Inventor: James H. Brindle.

Japan Patent Information Organization database readout (including abstract) of reference referred to on p. 1 of the specification.

A Miniature Virtual Display Implement, Optoelectronics, vol. 6, No. 1, pp. 155–162, Jun., 1991.

*Primary Examiner*—Amare Mengistu
*Attorney, Agent, or Firm*—Ronald P. Kananen; Rader, Fishman & Grauer

[57] ABSTRACT

In order to facilitate pupil distance adjustment, diopter adjustment and convergence adjustment, in a spectacle type display arrangement which utilizes of a pair of image generating units for projecting images on left and right eyes respectively, a pair of shafts are installed in a housing by way of a frame, and a pair of lens and mirror units are reciprocally mounted on the shafts so as to movable toward and away from each other. A slide plate which forms part of a backlight is disposed on the frame so as to be slidable in the fore-and-aft direction. A pair of shafts are disposed one above the other at the upper and lower portions of the backlight. A pair of LCD holders which form a part of the pair of image source means are supported on the shafts so as to be laterally movable toward and away from each other. A pupil distance adjustment of the pair of image generating means is implemented by a rotation of a knob 8 through cam and link mechanisms, while a diopter adjustment and a convergence adjustment are simultaneously implemented by a rotation of a knob through a separate cam mechanism.

17 Claims, 20 Drawing Sheets

U.S. PATENT DOCUMENTS

| | | | |
|---|---|---|---|
| 4,952,024 | 8/1990 | Gale | 359/477 |
| 4,969,714 | 11/1990 | Fournier, Jr. et al. | 359/630 |
| 4,982,278 | 1/1991 | Dahl et al. | 348/53 |
| 5,003,300 | 3/1991 | Wells | 345/8 |
| 5,034,809 | 7/1991 | Katob | 348/53 |
| 5,093,567 | 3/1992 | Staveley | 250/221 |
| 5,124,840 | 6/1992 | Trumbull et al. | 359/472 |
| 5,125,733 | 6/1992 | Lee | 359/473 |
| 5,129,716 | 7/1992 | Holakovszky et al. | 351/50 |
| 5,187,503 | 2/1993 | Hilton | 351/128 |
| 5,276,471 | 1/1994 | Yamauchi et al. | 351/153 |
| 5,281,957 | 1/1994 | Schoolman | 345/8 |
| 5,347,400 | 9/1994 | Hunter | 345/7 |
| 5,355,253 | 10/1994 | Nanjo et al. | 359/473 |

SPECTACLE TYPE DISPLAY DEVICE

BACKGROUND OF THE INVENTION

1. Field of the Invention

The present invention relates generally to a spectacle or goggle type display device. More specifically, the present invention relates to a spectacle or goggle type display device which enables a wearer to observe an electronically produced image, such as that produced in response to a video or television signal, in addition to his or her surroundings (viz., the outside view), and which includes an improved adjustment arrangement whereby both pupil distance and diopter adjustment can be easily implemented 2. Description of the Related Art The applicant has previously proposed spectacle or goggle type display devices which enables the monitoring of a video image and the like and which use LCD. An example of such a display device is disclosed in Japanese Patent Application No. 3-251667 (JP-A-05-091582). One of these arrangement will be briefly discussed with reference to FIGS. 27 and 28. In the illustrated arrangement, 100 denotes a spectacle type display device, which includes goggle-type housing or body 101, and a pair of bows or temples 102, 102 foldably mounted on either sides of the housing 101. An inverse V-shaped reflector 103 is mounted on an inverse V-shaped nose pad portion 101a at a lower center portion of the housing 101. A fluorescent tube 104 is arranged above the reflector 103, while a pair of vertically arranged transparent type color liquid crystal panels (image display means) 105, 105 are disposed on either side of the reflector 103. A convex converging lens is arranged in intimate contact with each of the color liquid crystal panels 105 via a deflection plate 107.

A pair of convex ocular lenses 108, 108 are arranged in the housing 101 in front of the left and right eyes A, A, respectively. A pair of rectangular reflection mirrors 109, 109 is arranged in the housing 101 between a pair of converging lenses 106, 106 and a pair of ocular lenses 108, 108.

In FIG. 28, 102a denotes earphones which are attached to each bow 102. The front side of the housing 101 is opaque. Furthermore, as shown in FIG. 27, a pair of rectangular ocular window portions 101b, 101b open at the rear face side of the housing 101. The pair of ocular window portions 101b, 101b are covered with a transparent window plates, respectively, for protecting the ocular lens 108, 108 and the other elements which are arranged in the housing 101, from dust or the like type of contamination.

As shown in FIG. 28, when the above described spectacle type display device 100 is worn by a user, an image which is produced by the pair of color liquid crystal panels 105, 105 in response to a signal from a small portable VTR (not shown), is illuminated by the fluorescent tube 104 and is projected onto the respective retinas a of the right and left eyes A, A by way of a pair of converging lenses 106, 106, the pair of reflection mirrors 109, 109 and the pair of ocular lenses 108, 108. That is, the image formed by the pair of color liquid crystal panels 105, 105, is reflected by the pair of reflection mirrors 109, 109, and a virtual image which is enlarged by the pair of ocular lenses 108, 108 is formed at a position of least distance of distinct vision.

However, in the above-mentioned conventional spectacle type display device 100, the inverse V-shaped reflector 103 is mounted on the inverse V-shaped nose pad portion 101a at the lower center of the housing 101 so that the images produced by the respective of the pair of color liquid crystal panels 105, 105 are projected onto retina a of the left and right eyes A, A by way of lateral deflection. Therefore, it is difficult to form the nose pad portion 101a in a manner which prevents the reflectors from contacting the wearer or user's nose. Accordingly, in the case wherein a user having a high (prominent) nose, wears this type of display device 100, it has been difficult to adjust the positions of the ocular lenses 108, 108 with respect to the wearer's left and right eyes. Also, since it not possible to move the pair of color liquid crystal panels 105, 105 toward and away from the reflector 103, it is difficult to satisfactorily adjust the arrangement for a user having closely set eyes.

SUMMARY OF THE INVENTION

It is an object of the present invention to provide a spectacle type display device of the type which includes a pair of image display means and wherein both pupil distance and diopter adjustment can be easily implemented.

It is a further object of the present invention to provide a mechanism which can be incorporated into a suitable housing and which facilitates both pupil distance and diopter adjustment.

It is a further object of the present invention to provide a mechanism which can be incorporated into a suitable housing and which allows pupil distance to be adjusted and which separately enables diopter and convergence adjustment to be simultaneously adjusted.

In brief, the above object is achieved by a spectacle type display device which is arranged such that each of images produced by a pair of image display means provided in a box-shaped housing, is modified by a pair of ocular lenses and projected onto retinas of the wearer's left and right eyes. A shaft is supported on a frame in the above-mentioned housing, and a pair of lens and mirror units, which constitute a vital part of the above-mentioned image display means and which include a reflector and the ocular lens, are arranged along the shaft so as to be laterally movable in the left and right directions toward and away from each other. Each of the lens and mirror units is arranged to be movable in the fore-and-aft direction toward and away from each of the refection plates and ocular lens and therefore relative to the above-mentioned frame.

Since the pair of lens and mirror units are arranged to be movable in the left and right direction along the shaft installed on the frame, the mechanism by which the pupil distance for each of the lens and mirror units can be adjusted is simplified.

Also, since the position of each ocular lens is simultaneously adjusted at the position with respect to the left and right eyes, the pupil distance adjustment is easily implemented. Further, since the image generating units are arranged to be movable in the fore-and-aft direction relative to the frame, the diopter adjusting mechanism is simplified and the diopter adjustment is facilitated.

More specifically, a first aspect of the invention resides in a spectacle type display device which is enclosed in a housing and which is arranged to transmit images generated by a pair of image sources, by way of a pair of image transfer means which each include a reflection plate and an ocular lens, and to project the images produced by the pair image sources on retinas of the left and right eyes of a wearer, and which comprises: first support means for supporting the pair of image transfer units so as to be laterally movable toward and away from each other, and second support means for supporting the pair of image sources so that the image sources are laterally movable toward and away from each other and in a fore-and-aft direction relative to the reflection plates and the ocular lenses of the image transfer means.

A second aspect of the present invention resides in a spectacle type display apparatus comprising: a frame disposed in a body; a pair of display means, disposed on the frame, for producing a pair of images in accordance with a video signal; a pair of reflection means for reflecting the pair of images produced by the pair of display means; a pair of lenses means for focusing the pair of images reflected by the pair of reflection means; a first slide means for sliding the pair of lens means and the pair of reflection means laterally across the frame; and a second slide means for sliding the pair of display means toward and away from the pair of lenses in the fore-and-aft direction of the frame.

A further aspect of the invention resides in an apparatus for use in a spectacle type display, comprising: a frame; first and second image sources supported on the frame so as to be reciprocal toward and away from each other in a first direction which extends laterally across the frame, and synchronously movable in a second direction which is essentially normal to the first direction; a first mirror supported on the frame so as to be in a predetermined relationship with the first image source, the first mirror being reciprocal in the first direction across the frame; a first lens supported on the frame in a predetermined relationship with the first mirror, the first lens being connected with the first mirror so as to be synchronously movable therewith in the first direction; a second mirror supported on the frame so as to be in a predetermined relationship with the second image source, the second mirror being reciprocal in the first direction with respect to the frame and toward and away from the first mirror; a second lens supported on the frame in a predetermined relationship with the second mirror, the second lens being connected with the second mirror so as to be synchronously movable therewith in the first direction; first adjustment means for selectively moving the first and second mirrors in the first direction and so that the relative distance between the first and second mirrors changes; and second adjustment means for moving the first and second image sources in the second direction and in a manner which changes the relative distance between first and second image sources and the first and second mirrors, respectively, and for simultaneously moving the first and second image sources in the first direction in a manner which changes the relative distance therebetween in response to the movement of the first and second images sources in the second direction.

Another aspect of the present invention resides in a method of operating a spectacle type display comprising the steps of: producing a first image using a first image source; reflecting the first image using a first mirror; focusing the first image using a first lens; reflecting the focused first image toward a first predetermined eye position; producing a second image using a second image source; reflecting the second image using a second mirror; focusing the second image using a second lens; reflecting the focused second image toward a second predetermined eye position; moving the first mirror and the first lens and the second mirror and the second lens as first and second units respectively, in a first direction which changes the relative distance between the two units; moving the first and second image sources in a direction which changes the relative distance between the first and second image sources and the first and second mirrors respectively; and simultaneously moving the first and second image sources with respect to one another and in a manner which changes the relative distance therebetween.

Yet another aspect of the present invention resides in a apparatus for use in a spectacle type display, comprising: means for producing a first image; means for reflecting the first image; means for focusing the reflected first image; means for reflecting the focused first image toward a first predetermined eye position; means for producing a second image; means for reflecting the second image; means for focusing the second image; means for reflecting the focused second image toward a second eye position; means for moving the first mirror and the first lens and the second mirror and the second lens as first and second units respectively, in a first direction which changes the relative distance between the two units; first means for moving the first image and second image sources in a direction which changes the relative distance between the first and second image sources and the first and second mirrors respectively; and second means, responsive to the first means, for simultaneously moving the first and second image sources with respect to one another and in a manner which changes the relative distance therebetween.

BRIEF DISCLOSURE OF THE DRAWINGS

The various objects, advantages and merits of the present invention will become more clearly appreciated as a detailed description of the preferred embodiments of the invention are given in conjunction with the appended drawings in which.

DETAILED DESCRIPTION OF PREFERRED EMBODIMENTS

Figure 1:
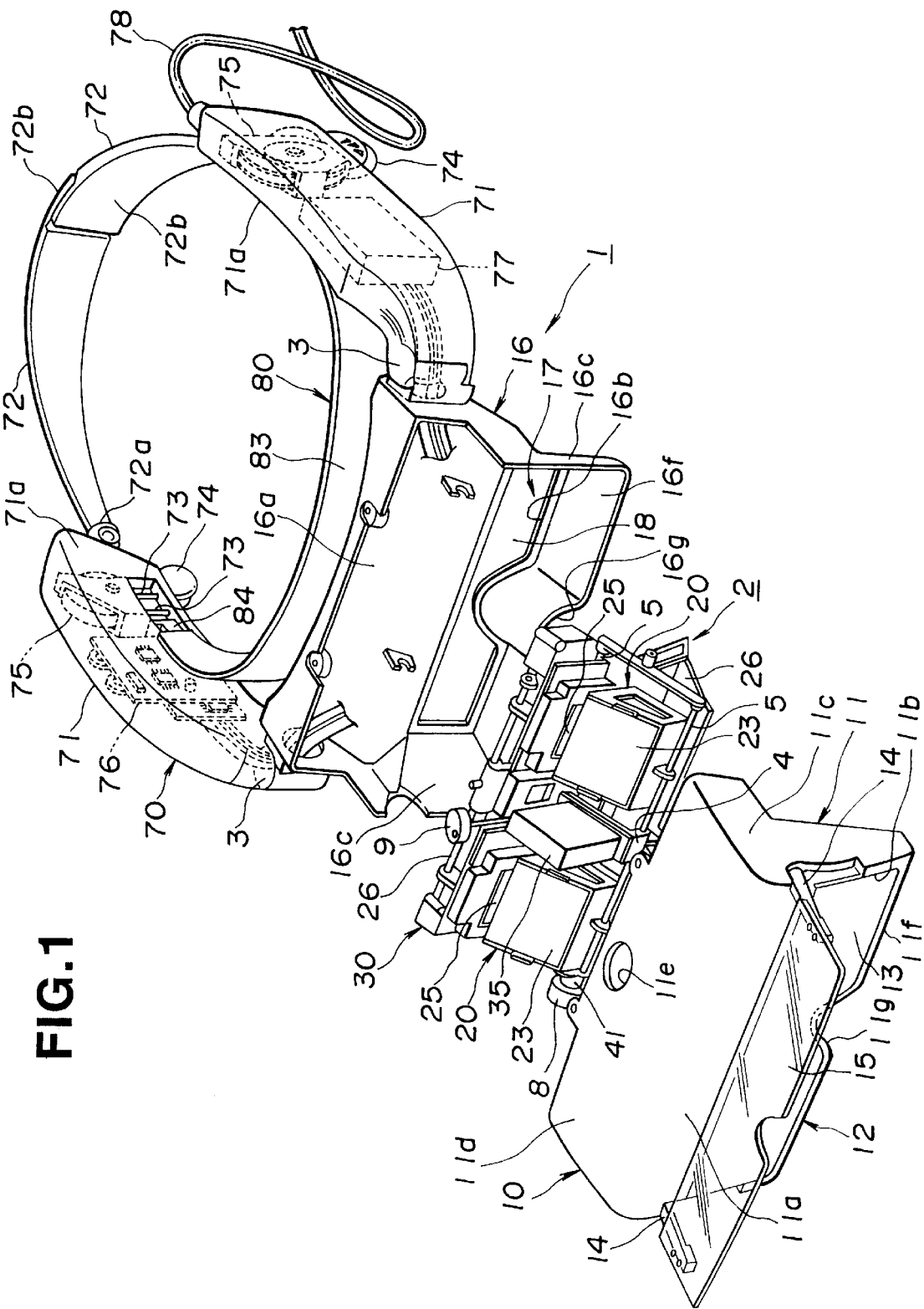
FIG. 1 is an exploded perspective view of a spectacle type display device according to a first embodiment of the invention.
Figure 2:
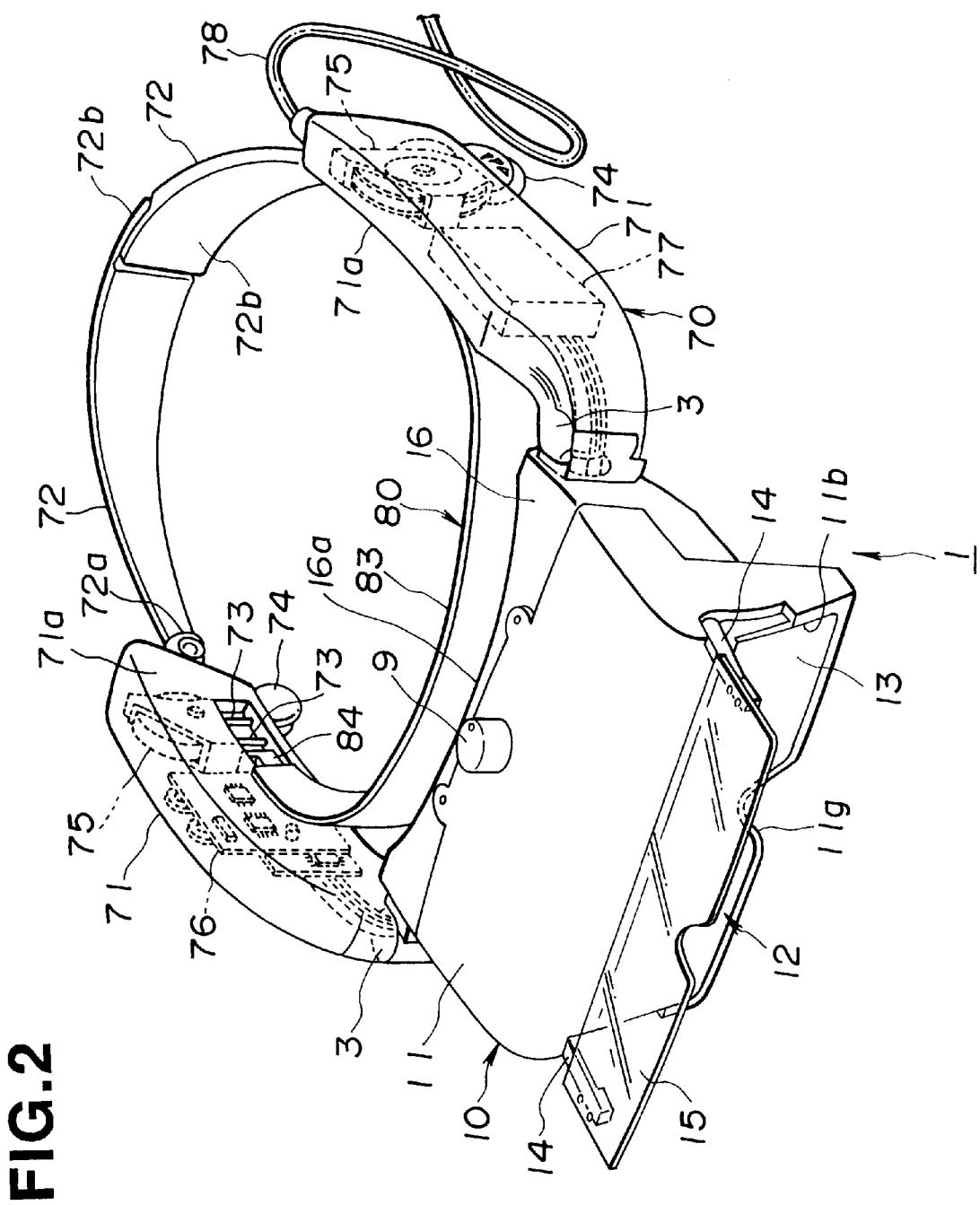
FIG. 2 is a perspective view of the above-mentioned spectacle type display device.

In FIGS. 1 and 2, a spectacle type display device 1 which generally comprises an essentially box-shaped (ski goggle-shaped) housing 10 which is formed a spectacle portion to be positioned in front of the wearer's eyes when donned. An image generating arrangement 2 which is received in the housing 10 includes a pair of image generating units (means) 20, 20 and a backlight 30. A head band-like support arrangement 70 is connected through hinge portions 3, 3 to the rear side portions of the housing 10.

Figure 3:
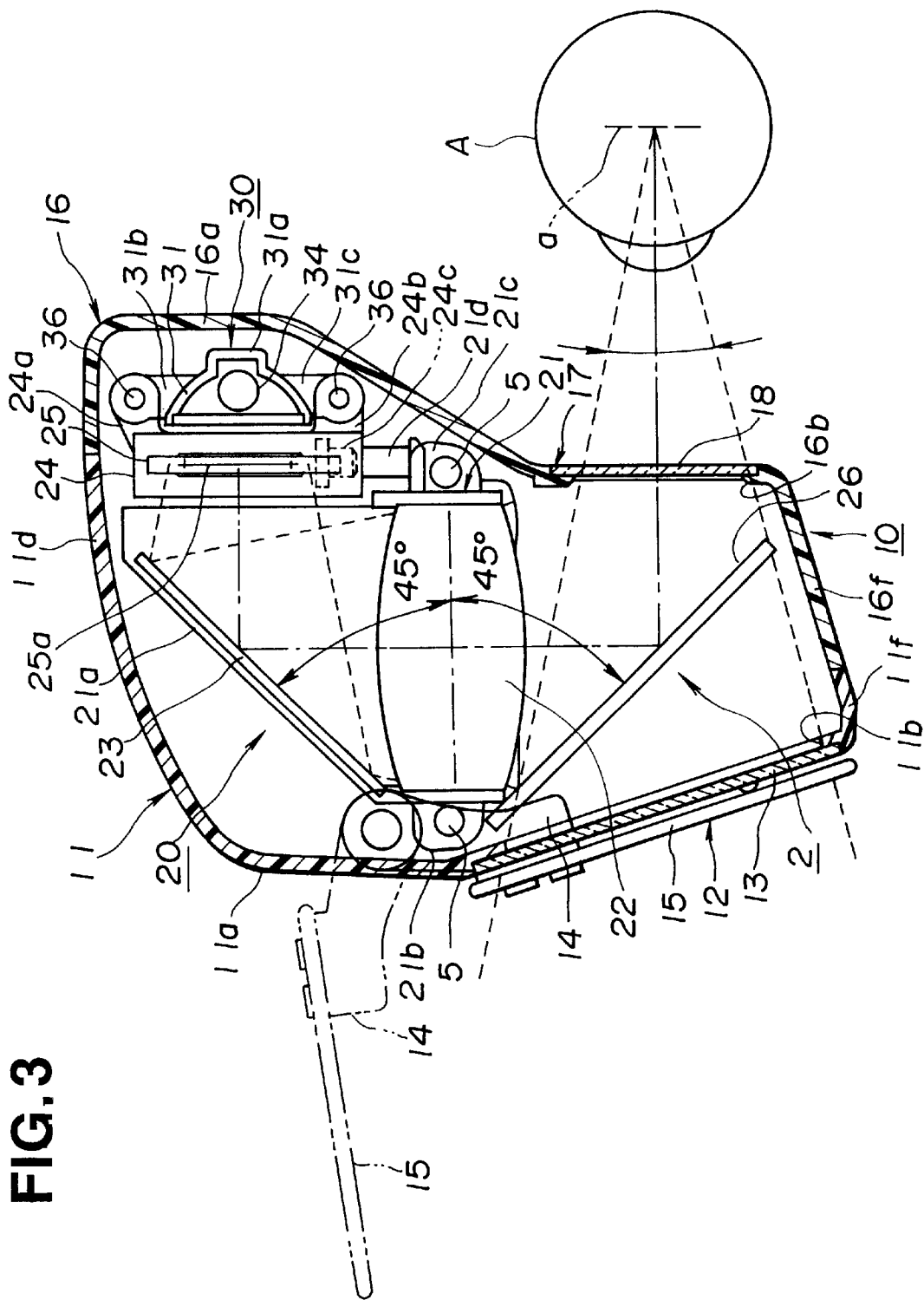
FIG. 3 is a vertical cross-sectional view of a housing used in the above-mentioned spectacle type display device.

As shown in FIGS. 1 to 3, the housing 10 comprises a front cabinet 11 which is made of an opaque synthetic resin and which has a generally channel-shaped vertical cross-section, and a rear cabinet 16 having a generally channel-shaped vertical cross-section. The rear cabinet 16 is also formed of an opaque synthetic resin and is constructed such that its front peripheral portion is connected with a rear peripheral portion of the front cabinet 11 by way of screws so as to form a hollow housing.

A translucent viewing window portion 12 extends laterally across the front face 11a of the front cabinet 11. This translucent viewing window portion 12 includes a transparent plate 13 made of a synthetic resin and is engaged in an opening portion 11b predominantly formed at the front face 11a of the front cabinet 11, and a smoked or tinted plate 15 which acts as a light reduction means. In this arrangement, the tinted plate 15 is supported on hinges 14, 14 which are provided at the sides 11c, 11d, of the front cabinet 11 so as to allow the tinted plate 15 to be swung upwardly from the position wherein it is located immediately in front of transparent plate 13, to an essentially horizontal position such as that shown in two-dot-phantom.

A circular opening 11e is formed at a rear center of an upper piece portion (upper face) 11d of the front cabinet 11, and an inverse U-shaped nose receiving portion 11g is formed in the lower or bottom face 11f of the front cabinet 11.

The rear face 16a of the rear cabinet 16 is formed so as to have a stepped configuration and such that the upper half projects further rearwardly than the lower side half. The lower side half defines an ocular window portion 17 which extends across the width of the rear cabinet. The transparent ocular window portion 17 comprises a wide opening portion 16b formed in the lower half of the rear portion 16a and a transparent plate 18 made of synthetic resin which is engaged with the opening 16b, in the manner shown in FIGS. 3 and 4.

Figure 4:
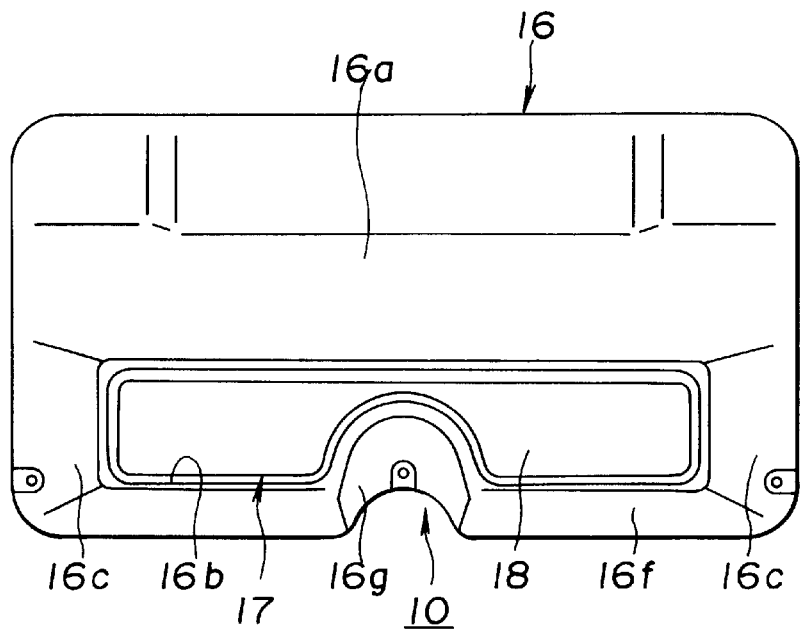
FIG. 4 is a rear view of the housing.
Figure 5:
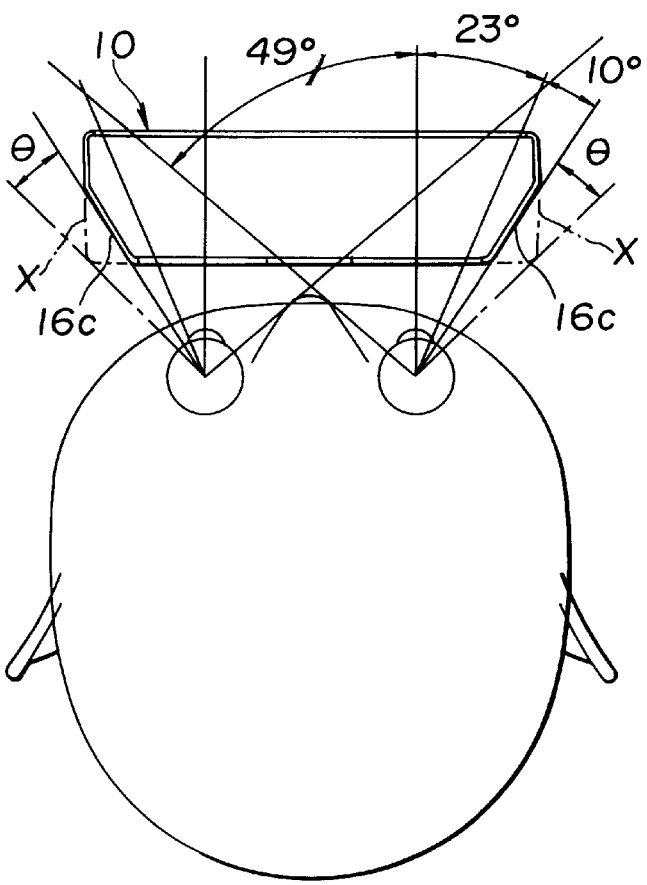
FIG. 5 is a schematic plan view depicting the optical disposition of the spectacle display device with respect to the wearer's left and right eyes.

Further, as shown in FIGS. 4 and 5, the housing is so shaped that each corner portion X, X is omitted and such that both sides (rear portion of both sides) 16c, 16c are angled in a manner which aligns with the line of sight (a line of sight directed respectively to the left and right sides by an angle of 30° with respect to the norm or dead ahead direction).

Figure 6:
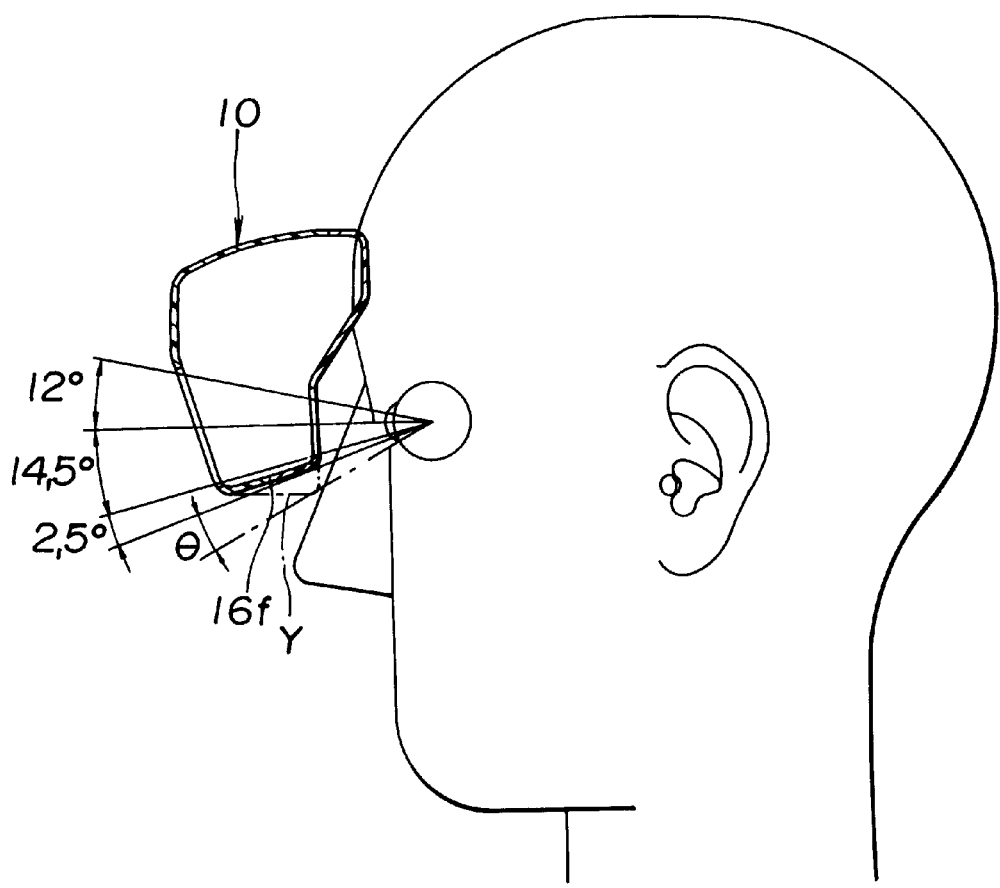
FIG. 6 is a schematic vertical cross-sectional view depicting the optical disposition of the spectacle display device with respect to the wearer's eyes.

Furthermore, as shown in FIGS. 4 and 6, the lower surface 16f of the rear cabinet 16 is angled so as to align with a line of sight (a line of sight which is downwardly angled by 10°). That is to say, a corner portion Y of the rear side is omitted in the manner illustrated. With these arrangements, the field of external view to the left, right and lower sides is maximized.

Since the nose receiving portion 16g has an inverse U-shape and is formed at the center of the lower piece portion 16f of the rear cabinet 16, the center portion of the above-mentioned transparent ocular window portion 17 is narrowed at this location.

Figure 7:
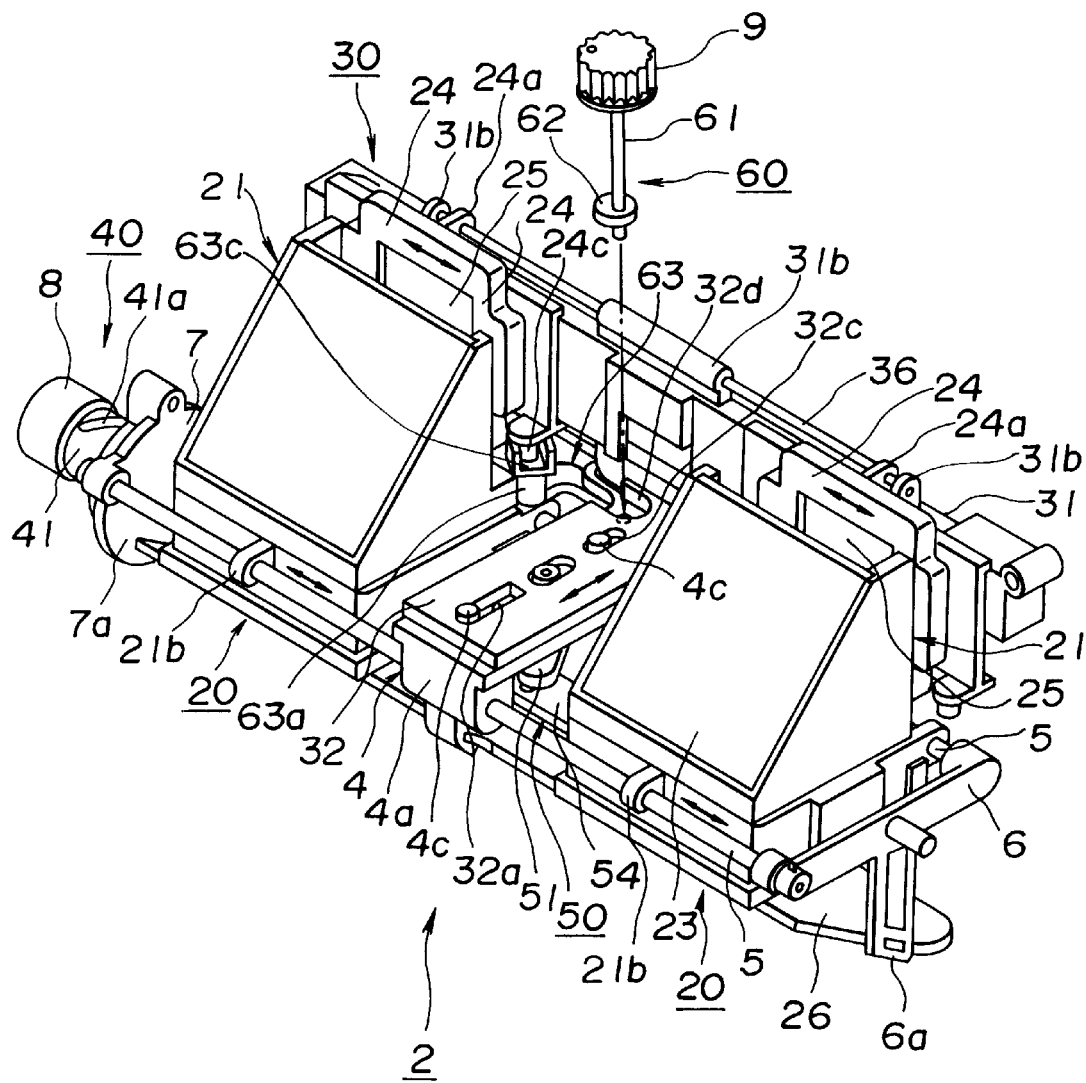
FIG. 7 is a perspective view of an image generating unit which is forms a vital part of the spectacle type display device according to the present invention.
Figure 8:
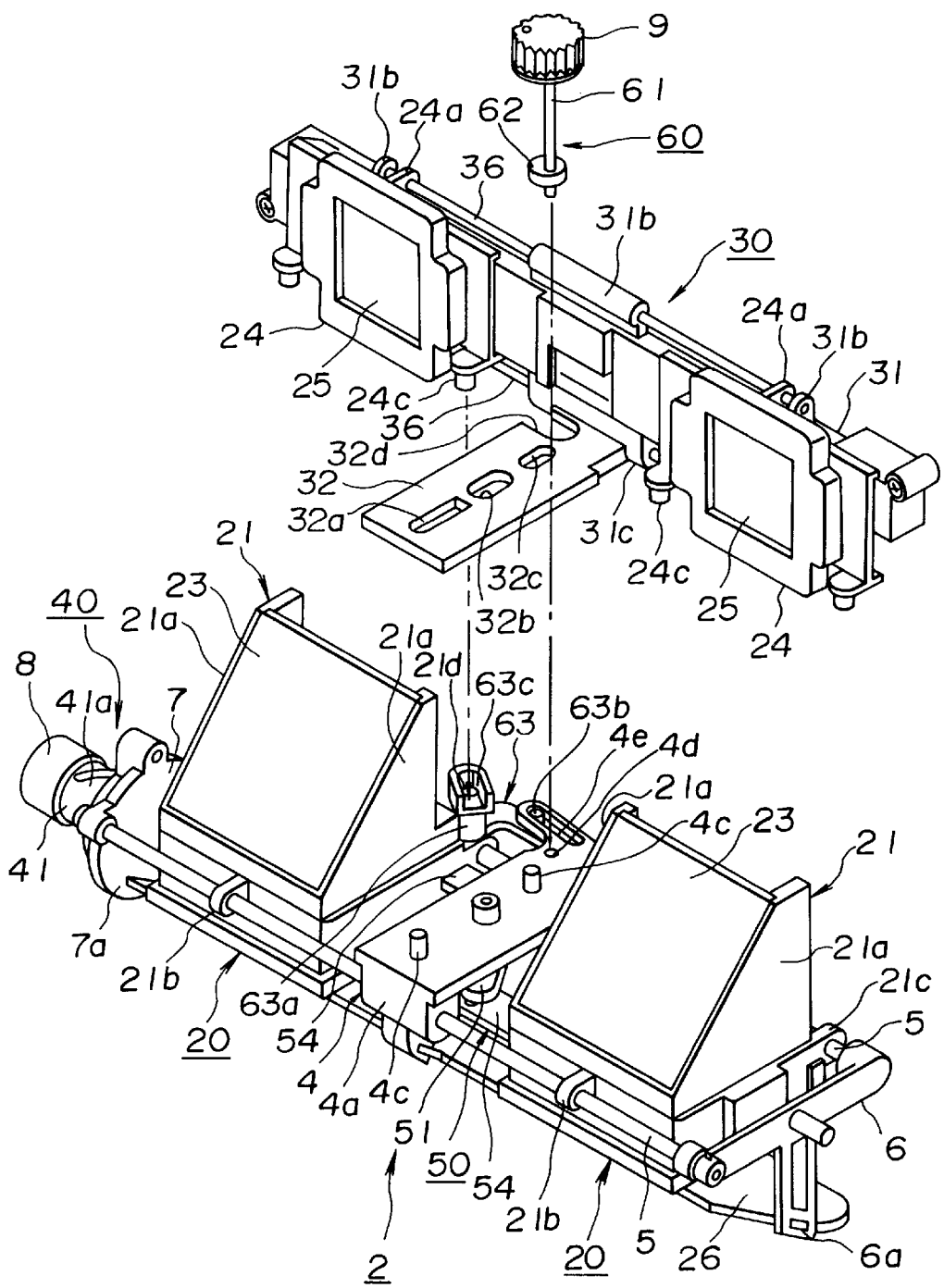
FIG. 8 is a exploded perspective view of the arrangement shown in FIG. 7.

As shown in FIGS. 7 and 8, the pair of image generating units 20, 20 of the above-mentioned image generating arrangement 2 respectively comprise a pair of lens and mirror units 21, 21 which have a rectangular shape and which are open at upper and lower ends. These lens and mirror units 21, 21 are supported on a pair of shafts 5, 5 which pass through front and rear lower extending portions 4a, 4b of the frame 4, which are made of synthetic resin and which have channel shaped side faces.

Ocular lenses 22 (see FIG. 3) which are engagingly supported in a horizontal position between the above-mentioned shafts 5, 5 and within the respective lens and mirror units 21, are arranged to be opposite reflection mirrors (upper reflection plate) 23 fixed between the respective upper peripheries of both side piece portions 21a, 21a. The reflection mirrors 23 are angled at 45° so that the upper periphery of the above-mentioned lens and mirror units 21 have an essentially triangular configuration.

Frame-shaped LCD holders 24 are vertically supported in front of a later-described backlight 30 so as be laterally movable in the left and light directions. Transmission type color liquid crystal panels (hereinafter abbreviated to LCD) 25 form a vital part of the image sources and are supported by the LCD holders 24. Wide-width half-mirrors (lower side reflection mirror plate) 26 are supported so as to be tilted relative to the ocular lens 22 by 45°. These half-mirrors 26 are fixedly connected with the lower extending portions 6a, 7a of the pair of left and right holders 6, 7 which support both ends of the above-mentioned pair of shafts 5, 5. As will be appreciated from FIGS. 7 and 8, the forward of the two shafts 5, 5 passes through the lower extending portion 4a formed at the front side of the above-mentioned frame 4. Although not shown, it will be understood that the rear of the two shafts 5, 5 passes through and is similarly supported by the lower extending portion 4b of the frame 4.

Figure 11:
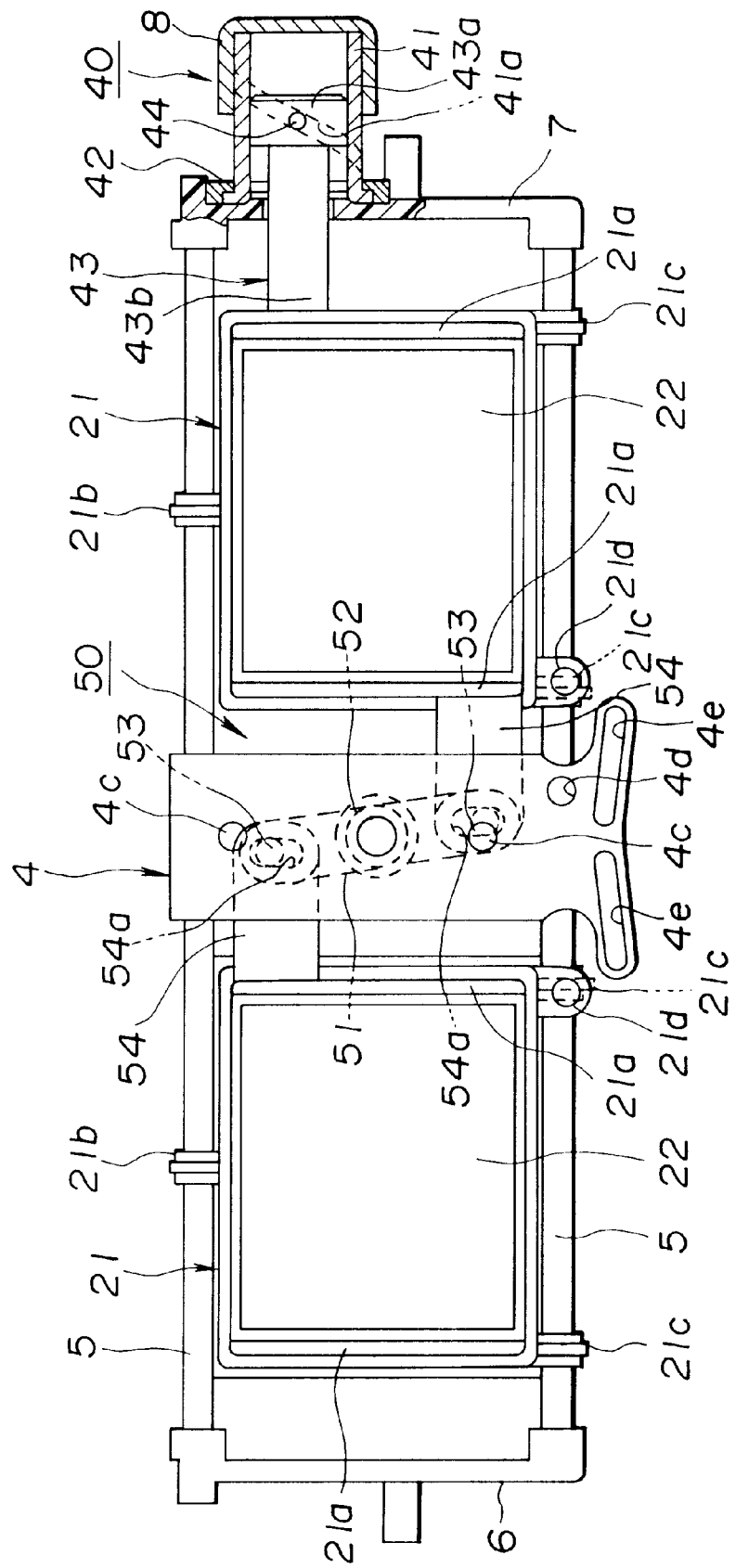
FIG. 11 is an enlarged plan view showing essential parts of the above-mentioned image generating unit.

Each of the lens and mirror units 21 is made of synthetic resin, is formed with openings at the upper and lower ends, and has a rectangular cross-section. The side portions 21a, 21a have an essentially triangle shape. As shown in FIGS. 7 and 11, supporting portions 21b, 21b, 21c, 21c through which the shafts 5, 5 pass, are integrally formed and project from the center of the front face and from both rear sides of the lens and mirror units 21, 21. With this arrangement, the lens and mirror units 21, 21 are simultaneously reciprocal in the left and right directions toward and away from each other by way of a cam mechanism 40 and an associated link mechanism 50, and in response to the rotation of a pupil distance adjusting knob 8 which is rotatably supported on the outboard side of the holder 7 in the illustrated manner.

As shown in FIGS. 3, 8 and 15–17, the backlight 30 consists generally of a reflector 31 in which a front arcuate face that is opposite to the LCD 25 is provided with a reflecting mirror finish. The reflector is integrally formed with a horizontally extending elongate rectangular slide plate 32 which is arranged to sit on top of the frame 4.

An elongate rectangular base plate 33 is disposed in a channel-like recess 31a formed at the apex of the reflector 31. An elongate fluorescent lamp 34 is supported on the base plate 33 so as to assume a predetermined relationship with the reflector 31. As shown in FIG. 1, a source of electrical power 35 is mounted on the slide plate 24 and supplies electric source to the fluorescent lamp 34 and the like.

A pair of parallel shafts 36, 36 extend laterally in the left and right directions pass through respective projecting portions 31b, 31c which are integrally formed with the reflector and which project from the upper and lower faces of the reflector 31.

Figure 15:
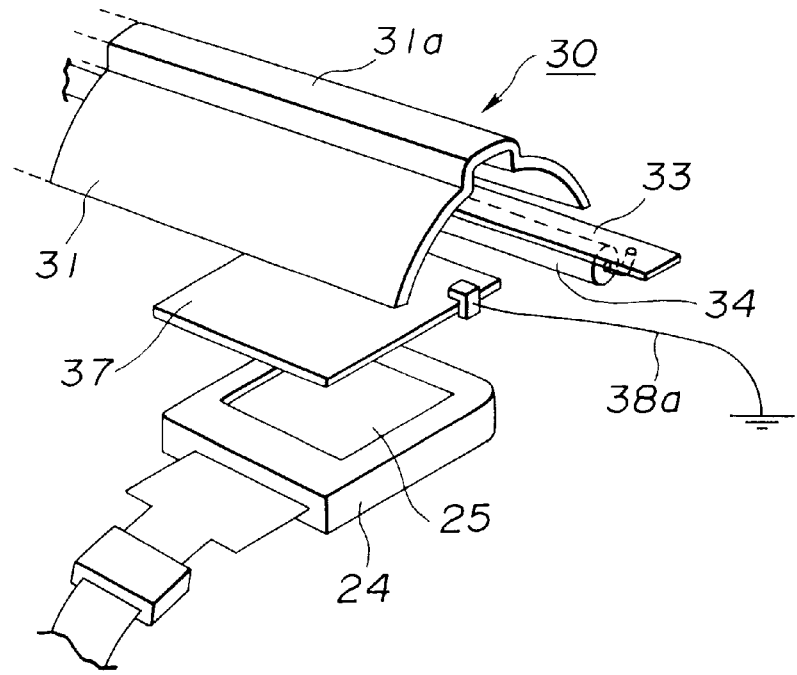
FIG. 15 is an exploded perspective view of a backlight used in the image generating units.
Figure 16:
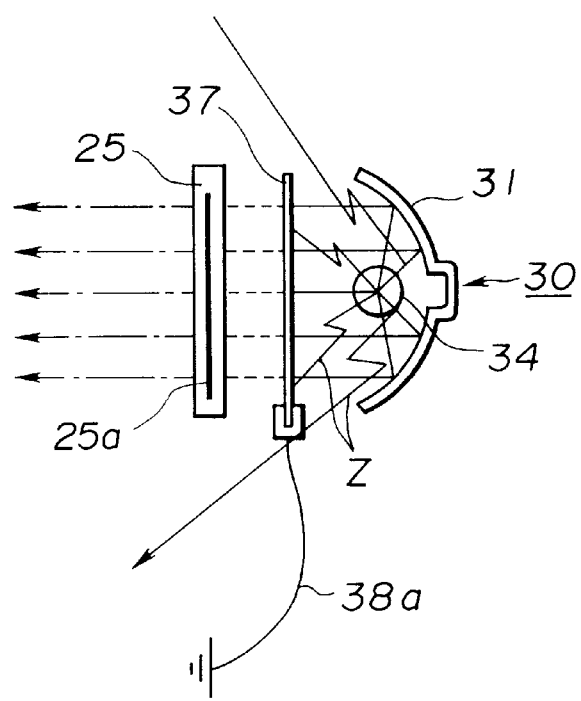
FIG. 16 is a schematic view demonstrating the essential features of the above mentioned backlight arrangement.

As shown in FIGS. 15 and 16, an electromagnetic shielding plate 37 in the form of a transparent electrode plate or strip, is disposed between the backlight 30 and the pair of LCD 25, 25. This strip-shaped transparent electrode plate 37, is formed of a transparent electrically conductive film produced by depositing indium-tin oxide (ITO) on a surface of a polyester film, or by depositing ITO on a diffusion plate and applying electrically conductive treatment thereto. Through the provision of this plate, high voltage and high frequency noise Z emitted from the fluorescent lamp 34, which is a high voltage drive high-frequency light source, is shielded, and the light reflected by the reflector is transmitted to each LCD without loss.

Figure 17:
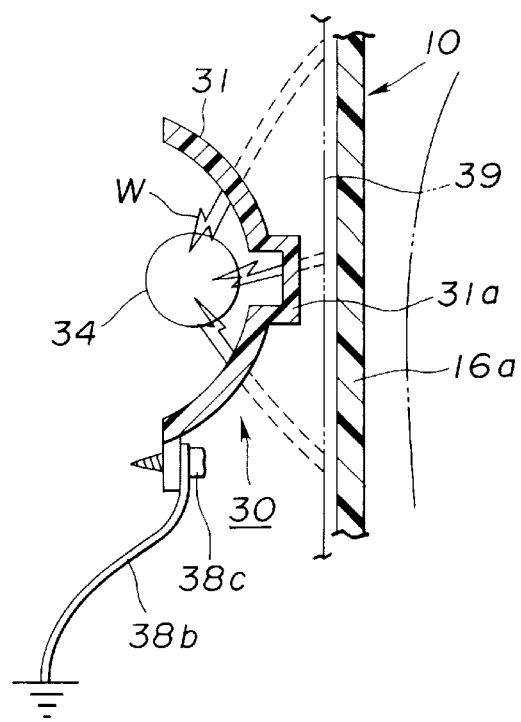
FIG. 17 is a cross-sectional view showing a reflector and electromagnetic shield arrangement used in the above-mentioned image generating units.

In this embodiment the reflector 31 is produced by mixing an electrically conductive material such as copper into a thermoplastic resin material. With this arrangement, the reflector also acts as a shield and as shown in FIG. 17, electromagnetic radiation produced by the fluorescent lamp 34 is additionally shielded by the reflector 31. An electromagnetic shielding plate 39 in the form of a sheet shaped electrically conductive plate is additionally disposed between the reflector 31 and the rear face 16a of the rear cabinet 16 of the housing 10. In FIGS. 15 and 16, character 38a denotes an earth wire which is connected to the transparent shielding plate 37, while in FIG. 17, character 38b denotes an earth wire which is connected to the reflector 31, and 38c denotes a screw which establishes an electrical connection between the earth wire 38b and the reflector 31.

The pair of LCD holders 24, 24 which support the respective LCD 25, 25 are supported on the shafts 36, 36 associated with the backlight 30, and are arranged to be reciprocally movable in the left and right directions therealong. That is, projecting portions 24a and 24b receive the respective shafts 36 and are integrally formed at upper and lower portions at the rear face of the respective holders 24, in the manner shown in FIG. 3.

As shown in FIG. 8, three slots 32a, 32b and 32c are formed along the center of the slide plate 32. In this embodiment it is arranged such that the slide plate 32 is slidable in the fore-and-aft direction on the frame 4 and to operatively engage with a pair of pins 4c and 4c which project up from the top face of the frame 4, and which are slidably received in the front and rear slots 32a and 32c. With this arrangement, the backlight 30 and the pair of LCD holders 24, 24 are arranged so as to be reciprocal in the fore-and-aft directions toward and away the respective reflection mirrors 23 in the lens and mirror units 21, 21, in response to the operation of the cam mechanism 60 and so as to be reciprocal in the left and right direction toward and away from each other.

As shown in FIG. 11, the cam mechanism 40 comprises a pupil distance adjusting knob 8, a cylindrical cam 41 which is engaged with the pupil distance adjusting knob 8 and which is rotatably supported on the right side of the holder 7 through a fixing ring 42. A rod 43 having a head portion 43a is fixedly connected with a base portion 43b of the right eye lens and mirror unit 21. An oblique cam slot 41a is formed in the cylindrical cam 41. A cam pin 44 which functions as a cam follower, is arranged to be movable along the above-mentioned cam slot 41a and is embedded in the head portion 43a of the rod 43. Accordingly, the head portion 43a is laterally displaced in the left and right direction in response to the rotation of the pupil distance adjusting knob 8.

Figure 23:
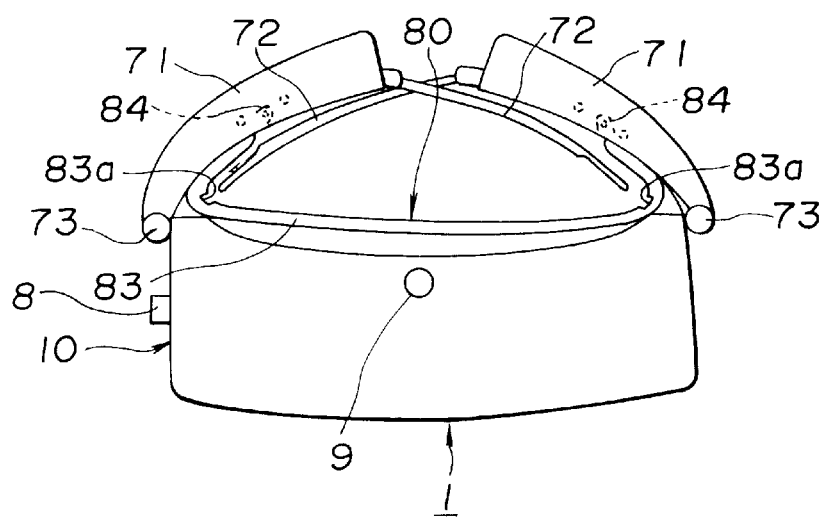
FIG. 23 is a plan view showing the display device which embodies the present invention, in a folded condition.

With this arrangement, the above-mentioned right eye lens and mirror unit 21 is arranged to move in the left and right directions along the pair of shafts 5, 5. As shown in FIG. 23, the pupil distance adjusting knob 8 projects out beyond the right side surface of the housing 10.

Figure 12:
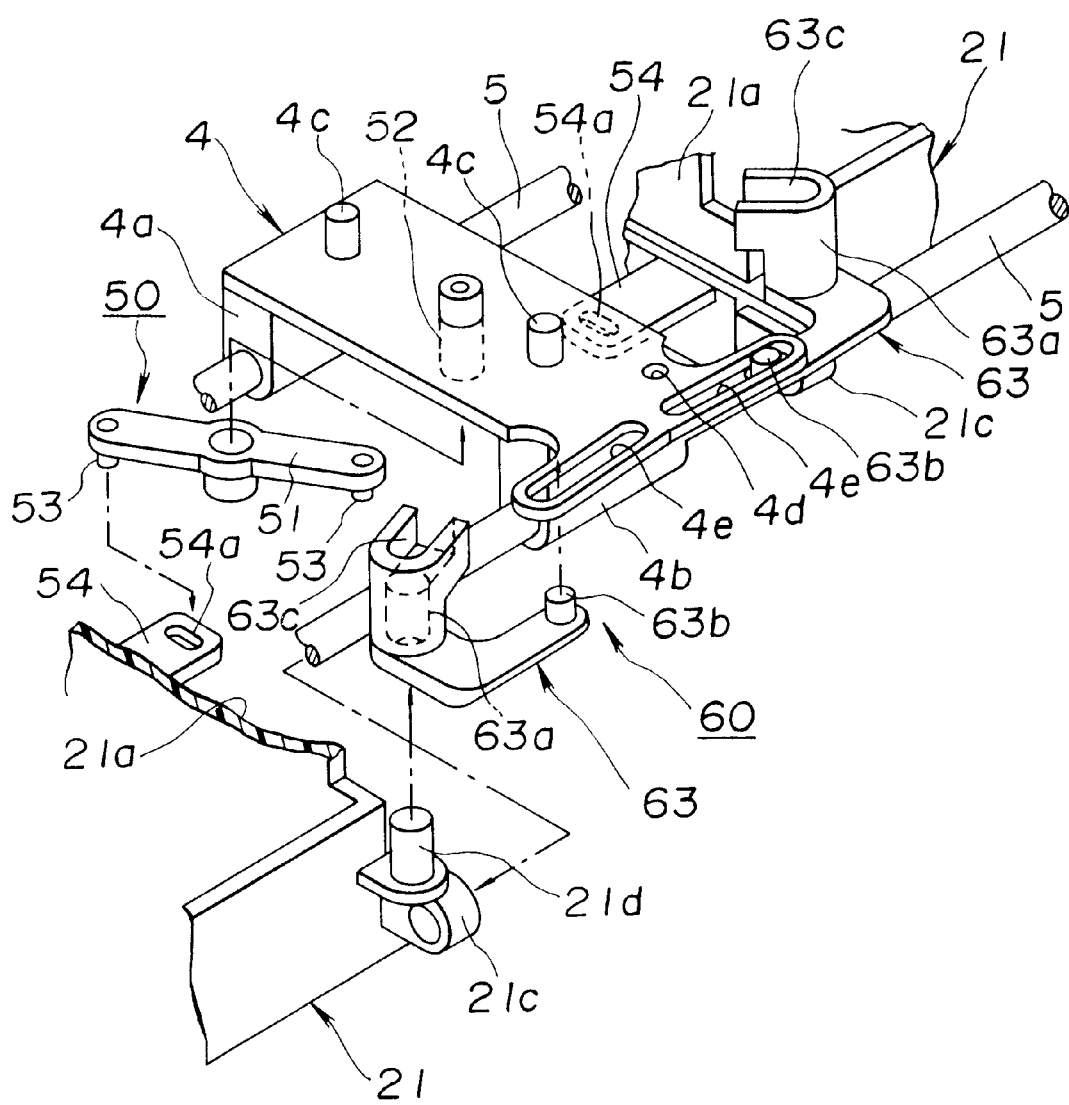
FIG. 12 is a exploded perspective view of a part of the above-mentioned unit.

As shown in FIGS. 11 and 12, the link mechanism 50 comprises a pivotal lever 51 which is pivotally supported on the a lower face of the frame 4 through a supporting shaft 52, a pair of pins 53, 53 disposed at the ends of the rotation lever 51, and a pair of arms 54, 54 which are integrally formed on the respective side portions 21a, 21a of the lens and mirror units 21, 21. A slot 54a is formed at the tip of each arm 54. The pins 53 of the lever 51 are slidably received in the slots 54a. In accordance with this construction, when the left eye lens and mirror unit 21 moves inwardly, the right eye lens and mirror unit 21 also moves inwardly, and when the left eye lens and mirror unit 21 moves outwardly the right eye lens and mirror unit 21 also moves outwardly.

As shown in FIGS. 8 and 12, the cam mechanism 60 comprises a diopter adjusting knob 9 which is fixed to the top of a shaft 61 that is rotatably supported in a relatively small diameter hole 4d formed in the frame 4. An eccentric cam plate 62 is fixed near the lower end of the shaft 61. The slide plate 32 has a U-shaped cam groove 32d which receives the eccentric cam plate 62. A pair of planar L-shaped cam arms 63, 63 rotatably support respective base portions 63a and are themselves supported on pins 21d which are integral with and which project from the back face of each image generating lens and mirror unit 21.

The frame 4 has a pair of cam slots 4e, 4e which are formed in a very shallow inverted V configuration and which slidingly receives cam pins 63b which are formed at the tips of each cam arm 63. Also, as shown in FIGS. 1 and 2, the diopter adjusting knob 9 projects out beyond the housing 10.

Figure 9:
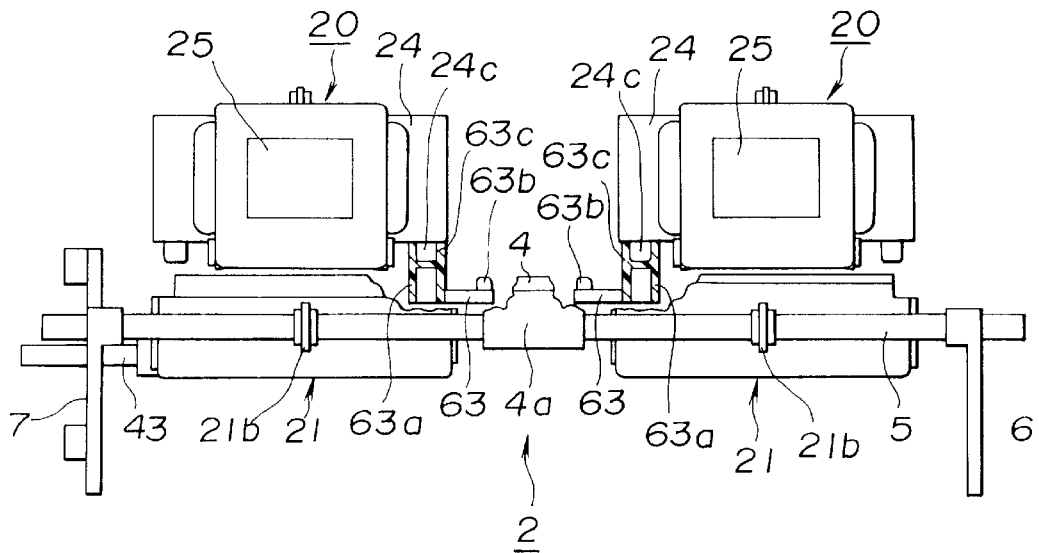
FIG. 9 is a rear view of the image generating unit shown in FIG. 7.
Figure 10:
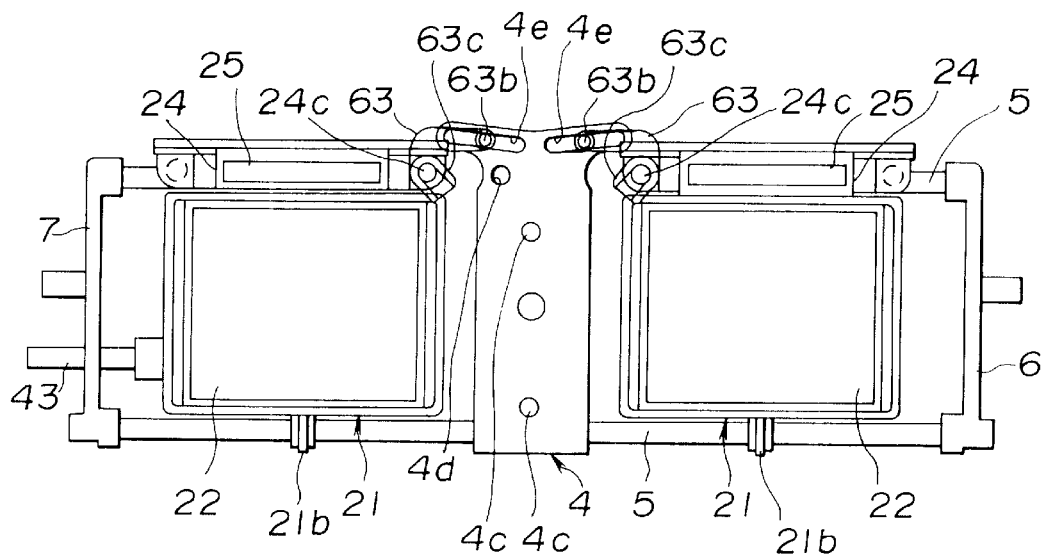
FIG. 10 is a plan view of the image generating unit shown in FIG. 7.

An obliquely projecting U-shaped recess 63c is formed in an upper portion of the base portion 63a of each cam arm 63. Pins 24c which project from the inboard corner portions of the LCD holders 24 are slidably received in the recesses 63c in the manner illustrated in FIGS. 9 and 10. With this arrangement, the diopter adjustment of the pair of ocular lenses 22, 22 is implemented through the for-and-aft reciprocation of the slide plate 32 on the frame 4.

Figure 13A:
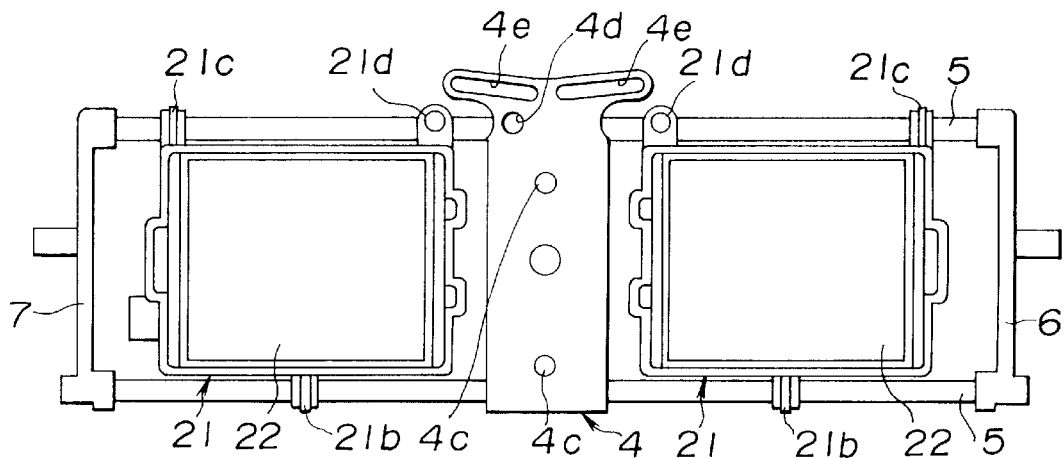
FIGS. 13A to 13C are respectively: a plan view of the above mentioned unit, a plan of the unit depicting diopter adjustment, and a plan view showing convergence adjustment.
Figure 13B:
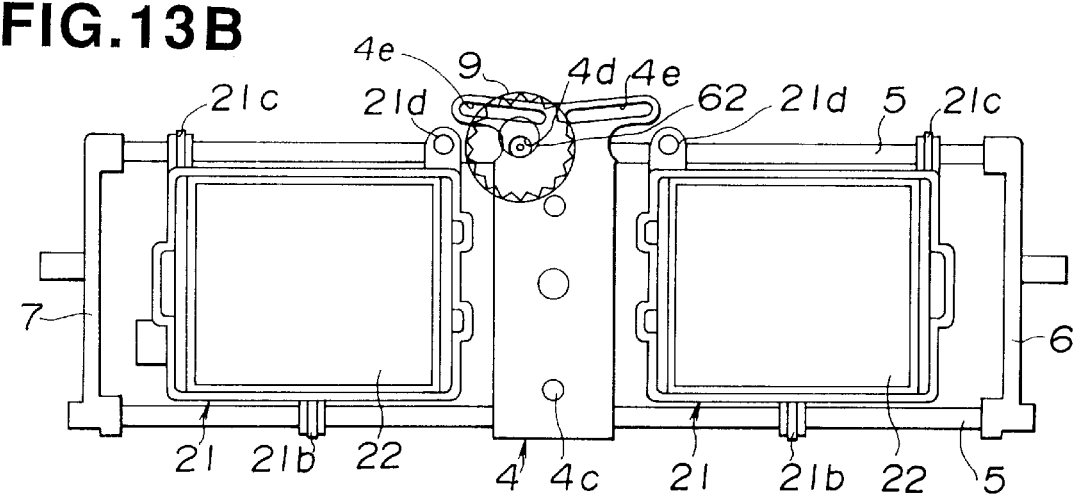
Figure 13C:
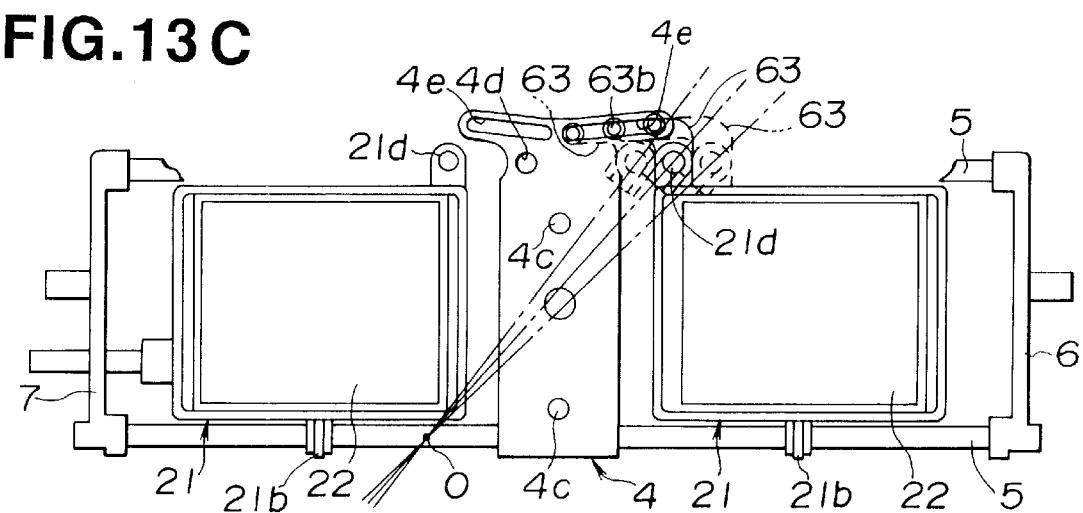
Figure 25:
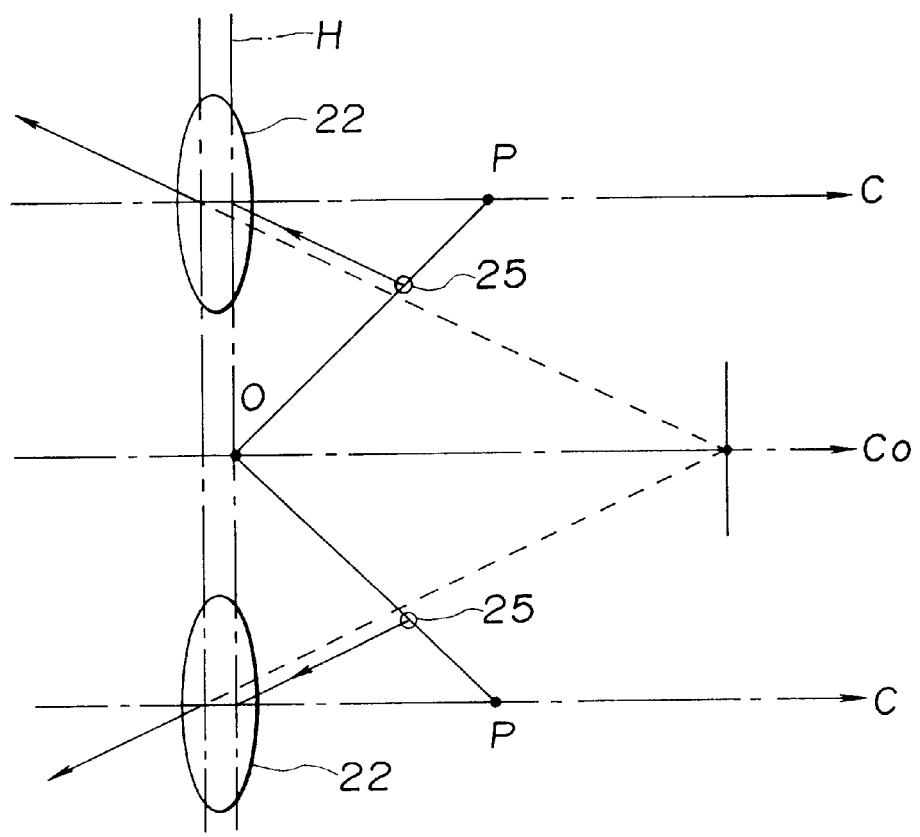
FIG. 25 is a schematic view showing the principle on which the diopter and a convergence adjustment of the above-mentioned spectacle type display device, is carried out.

Further, the convergence (angle) adjustment is implemented in that the pair of LCD holders 24, 24 are moved slightly toward and away from each other in accordance with the above-mentioned fore-and-aft directional movement of the slide plate 32. That is, as depicted in the diagram of FIG. 25 which demonstrates the principle on which the diopter and convergence adjustment is carried out, the convergence and diopter adjustments are implemented by parallel movement of the pair of LCD 25, 25 relative to the pair of ocular lenses 22, 22 along lines OP, OP which define a V-shape and which interconnect (a) the lens main plane H of the pair of ocular lenses 22, 22, (b) a line Co of a center of two lens light axes C, C and (c) a point at the center portion of the pair of ocular lenses 22, 22. Thus, when the pupil distance is changed, the inclination of the operating line of each LCD 25, 25 is also changed. In order to induce this change in synchronism with the change of the pupil distance, it is necessary to angle each cam arm 63 which is rotatably supported on a pin 21d. Therefore, by moving the cam pin 63b of each cam arm 63 along each cam slot 4e, the above-mentioned operating line OP is inclined so as to always pass through the origin point as shown in FIG. 13(c).

As shown in FIGS. 1 and 2, the head-band like support arrangement 70 comprises of a pair of first bow portions 71, 71 foldably supported to the housing 10 through the pair of hinge portions 3, 3, and a pair of second bow portions 72, 72 pivotally connected at each tip end portion 72a, 72a to each rear end center portion of each of the pair of first bow portions 71, 71.

Figure 24:
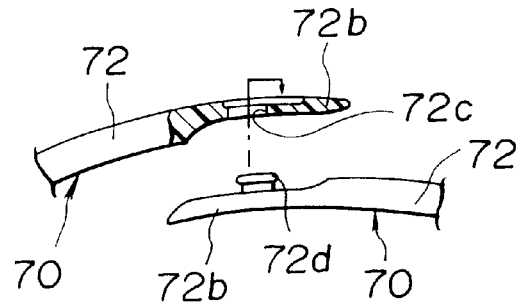
FIG. 24 is an explanatory view showing the connection arrangement used with head support members of the above-mentioned type of spectacle type display device.

As shown in FIG. 24, the ends of the base end portions 72b, 72b are detachably connectable with each other by means of an opening 72c and a T-shaped boss portion 72d. A forehead pad 80 is detachably connected by pins 73 which are disposed at a rear portion side of opposite inner faces 71a, 71a of the above-mentioned pair of first bow portions 71, 71. As will be appreciated from FIG. 22, three sets of pins 73 are provided to allow for head size adjustment.

As shown in FIGS. 1 and 2, each headphone receiving mechanism 75 for winding in the connection wires of each of the left and right headphones 74, is disposed in a rear portion of the first bow portions 71.

A circuit board 76 on which the LCD drive unit and the like is received, is disposed in one of the first bow 71, while a source of electrical power 77 is received in the other.

Furthermore, a connecting cable 78 for establishing an operative connection with a portable video player, TV tuner or the like, is connected to a rear upper end portion of the second of the first bow portions 71.

Figure 18:
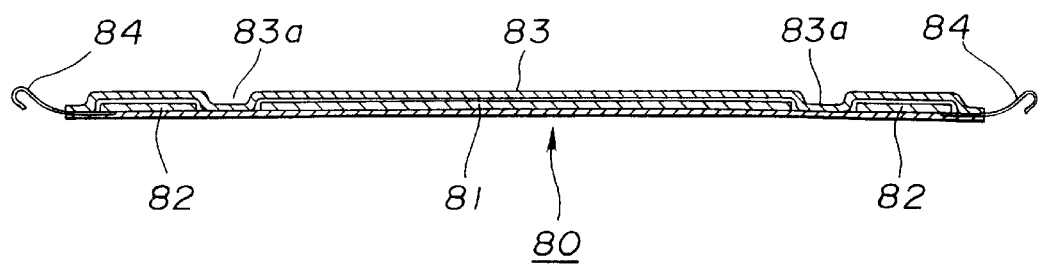
FIG. 18 is a horizontal cross-sectional view showing a forehead pad which is used with an embodiment of the above-mentioned spectacle type display device.
Figure 19:
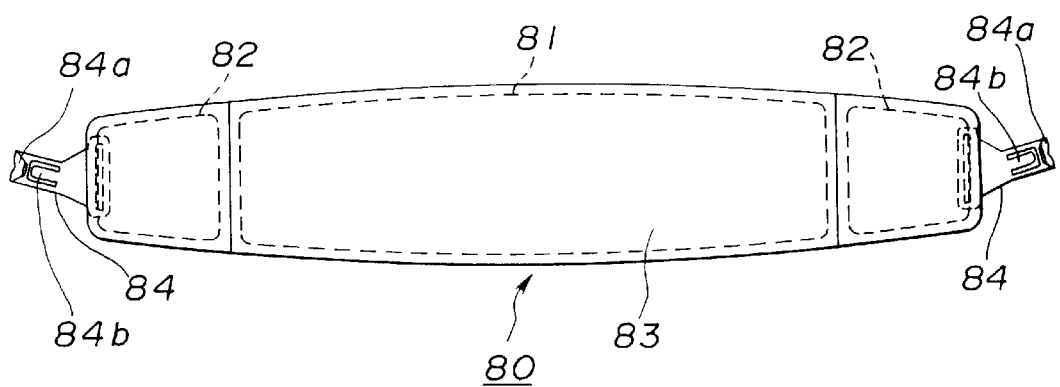
FIG. 19 is a front view of the above-mentioned forehead pad.
Figure 20:
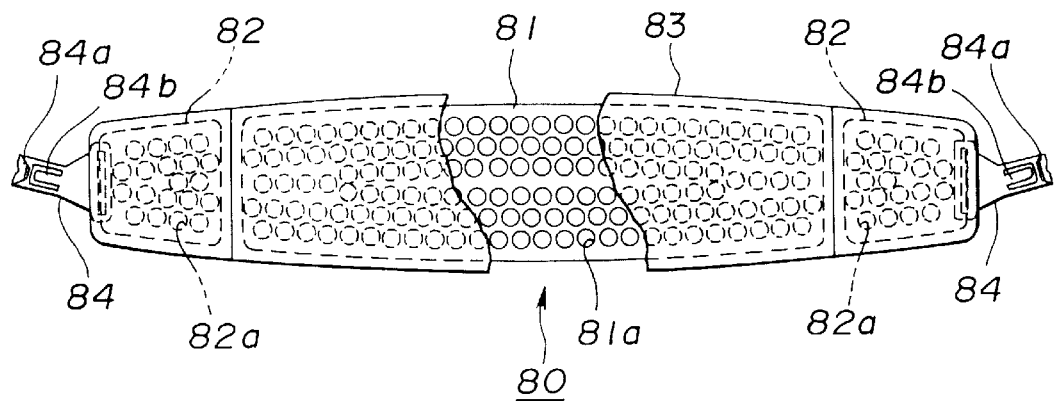
FIG. 20 is a front view of the above-mentioned forehead pad partly in cross-section.

As shown in FIGS. 18 to 20, the forehead pad 80 includes three hard core members 81, 82, 82 made of hard resin, a bag-shaped cover 83 made from a soft resin or the like which covers the respective core members 81, 82, 82, and a pair of hooks 84, 84 for enabling the detachable connection of the pad 80 to the respective pins 73 of the above-mentioned pair of first bow portions 71, 71.

As shown in FIG. 18, a pair of recess portions 83a, 83a are formed in the core members 81, 82, 82 of forehead pad 80, and the respective core members 82, 82. These recesses are formed on both sides of the pad in a manner which allows the pad to be foldable about the center portions of each of the recesses.

Figure 21A:
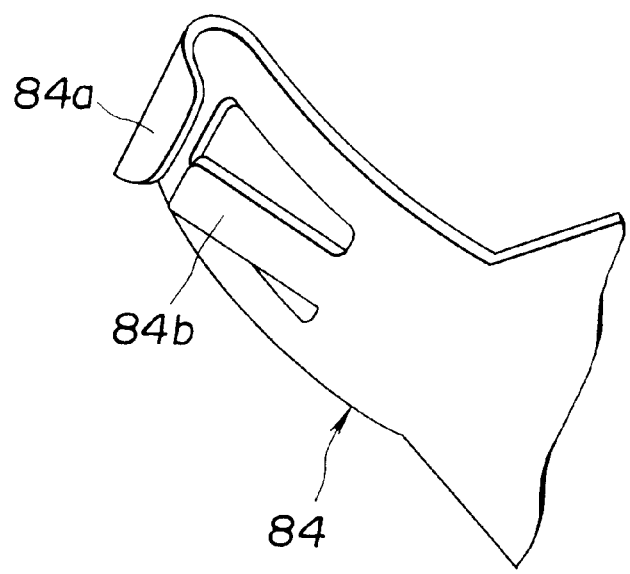
FIGS. 21A and 21B are respectively an enlarged perspective view showing a hook used on the above-mentioned forehead pad, and a cross-sectional view showing locked and unlocked conditions of the hook.

As shown in FIG. 20, a plurality of small ventilation holes 81a, 82a are formed in the respective core members 81, 82. Furthermore, as shown in FIGS. 21 and 22, each hook 84 is formed of metal plate and is such as to have a generally dog leg-shape as seen in side view. It is also arranged so that the forehead pad 80 can worn on the upper portion of the forehead (for example, a position raised upwardly by 15° from the horizontal as shown in FIG. 22). Each hook 84 has a spring characteristic and is arranged to be folded at its tip end portions 84a in a reversed U-shape. A tongue-like fixing piece 84b is cutaway and foldedly formed in a halfway portion of each hook 84 such that its tip end side approaches the above-mentioned tip end portions 84a.

According to the spectacle type display device 1 of the first embodiment, in the case wherein the housing 10 is worn on the face, it is held in place by the head support arrangement 70. Since the forehead pad 80 has the three hard core members 81, 82, 82 at the center portion and both side portions and covered with a cover 83, and is installed on the rear face 16a of the housing 16, the ease with which the device can be donned is improved.

Further, since the forehead pad 80 is connected by way of the three pins 73 of the pair of first bow portions 71, 71 through the pair of hooks 84, 84 and inclined, it is possible to distribute the weight of the housing 10 and the head portion installation member 70 and thus reduce the weight which is applied to the face by way of the inclination (for example, 15° upward relative to the horizontal direction).

With this arrangement, discomfort due to the installation of the housing 10 and the head band-like support arrangement 70 is reduced and prevents the ear discomfort even when worn for prolonged periods. Furthermore, since a plurality of small ventilation holes 81a and 82a are formed in each core member 81, 82, 82 of the forehead pad 80, ventilation is good and prevents sweating. This further promotes comfort over long periods of use.

Figure 21B:
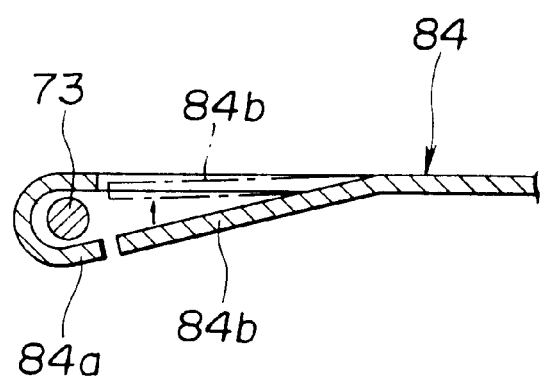
Figure 22:
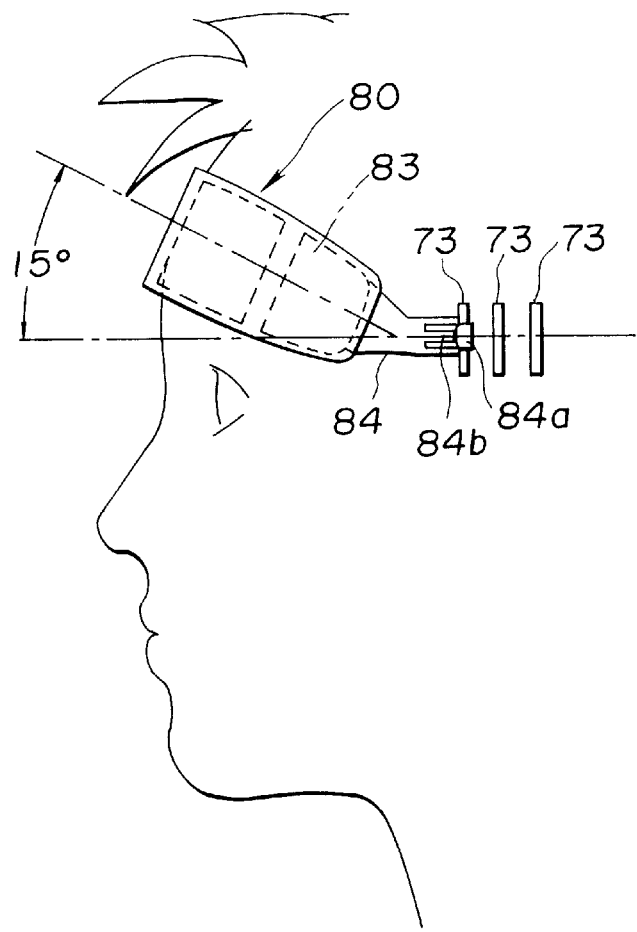
FIG. 22 is a schematic view showing the manner in which the forehead pad is worn.

As shown in a dot and dash line in FIG. 21(b), since it is possible to easily and elastically move the fixing piece portion 84b of each hook 84, it is possible to easily attach and detach it to either pin 73 of each fixing portion installed to the above-mentioned first bow portion 71. With this arrangement, it becomes possible to easily implement the adjustment of the forehead pad 80, and it becomes possible to adjust the forehead pad 80 in accordance with the head size of the user. In case that the spectacle type display device 1 is not used, it is possible to fold the forehead pad 80 about the pair of recess portions 83a, 83a of the cover 83 which are the boundary among the respective core members 18, 82, 82 of the above-mentioned forehead pad 80. Thus, it becomes possible to compactly fold the whole head band-like support arrangement 70 upon releasing the connection between the ends of the second bow portions 72, 72.

With this arrangement, after donning the housing 10 by means of the head band-like support arrangement 70, while looking through the transparent ocular window portion 17 of the rear cabinet 16 and rotatably the pupil distance adjusting knob 8 which projects out of the right side of the housing 10, it is possible for the user to adjust the positions of the lens and mirror units 21, 21 and therefore the positions of the respective ocular lens 22, 22 with respect to the left and right eyes A, A. That is, when the above-mentioned pupil distance adjusting knob 8 rotated, the cylindrical cam 41 is rotated, as shown in FIG. 11. In accordance with this cam rotation, the rod 43 is moved in the left and right directions through the cam pin 44 moving along the oblique cam groove-hole 41a of the cylindrical cam 41. When the rod 43 is moved inwardly with respect to the holder 7 toward the right hand side lens and mirror unit 21, the pair of left and right lens and mirror units 21, 21 are moved inwardly with respect to the frame 4 along the pair of shafts 5, 5. Conversely, when the rod 43 is moved outwardly with respect to the holder 7 the left and right lens and mirror units 21, 21 are moved outwardly with respect to the frame 4 along the pair of the shafts 5, 5.

Thus, with the rotation of the pupil distance adjusting knob 8, the position of the lens and mirror units 21, 21, namely the positions of the respective ocular lenses 22 with respect to the left and right eyes A, A of the user, are adjusted.

Then, as will be appreciated, due to the provision of the cam arms 63, 63 which are rotatably supported on the pins 21d, 21d of each lens and mirror unit 21, the pair of LCD holders 24, 24 are moved along the pair of shafts 36, 36 with respect to the backlight 30 and in the same direction as the lens and mirror units 21, 21. Accordingly, the positions of the pair of LCD 25, 25 are simultaneously adjusted with respect to the left and right eyes A, A. That is to say, when the pair of lens and mirror units 21, 21 are moved in the left and right direction along the pair of shafts 5, 5, the cam pin portion 63b of each cam arm 63 is moved as shown in FIG. 13C, obliquely along each cam groove-hole 4c formed at the frame 4. With this arrangement, each cam arm 63 is rotated (pivoted) around a pin 21d and thus develops a proper inclination relative to the position of each ocular lens 22. Therefore, the convergence of the virtual image of each LCD supported to the pair of LCD holders 24, 24 is also adjusted.

Figure 14A:
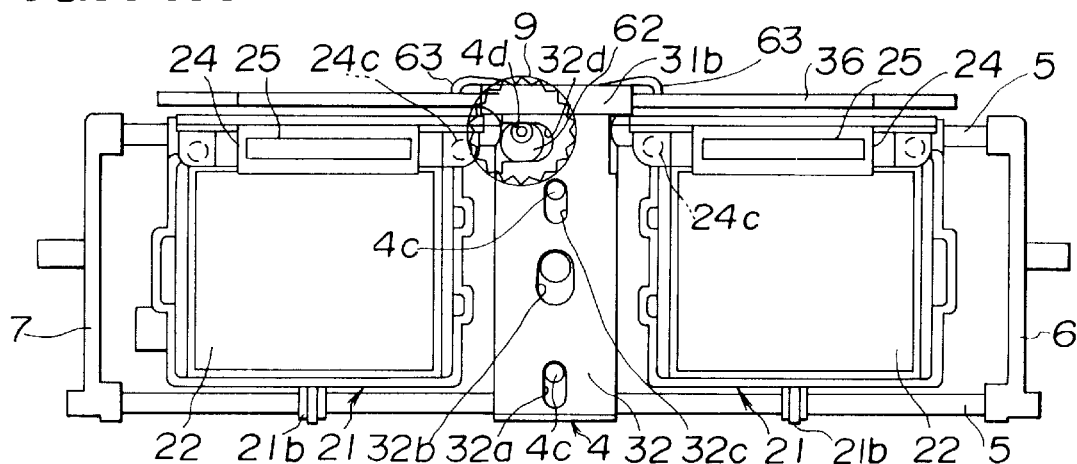
FIGS. 14A to 14C are plan views which depict diopter and convergence adjustment of the above-mentioned optical visual unit.
Figure 14B:
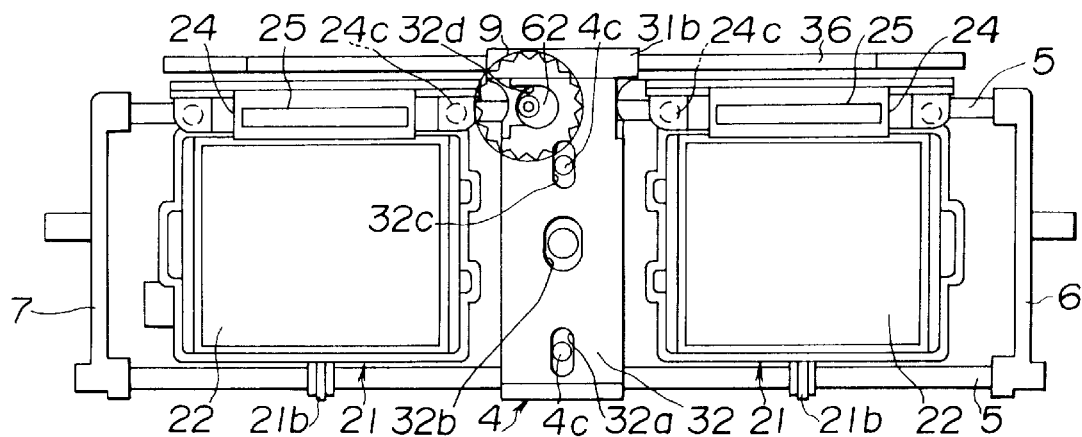
Figure 14C:
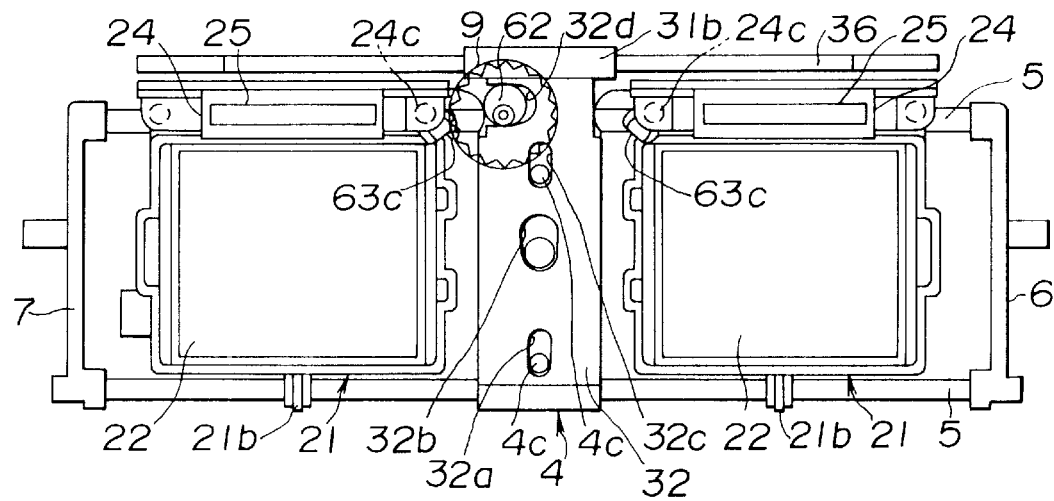

In the case wherein diopter adjustment is required, the diopter adjusting knob 9 is rotated. In response to this rotation, the eccentric cam plate 62 is eccentrically moved within the cam groove 32d formed in the slide plate 32 of the backlight 30. Accordingly, when the diopter adjusting knob 9 is rotated in the counter-clockwise direction from a state shown in FIG. 14A, the slide plate 32 is moved backward (upward as seen in the drawings) on the frame 4, and the LCD holders 24, 24 are moved away from the pair of lens and mirror units 21, 21 with the backlight 30. Conversely, when the diopter adjusting knob 9 is rotated in the clockwise direction from the state shown in FIG. 14C, the slide plate 32 is moved forward (downward as seen in the drawings) on the frame 4, and the pair of LCD holders 24, 24 approach the pair of lens and mirror units 21, 21. Thus, in accordance with the slide plate 32 of the above-mentioned backlight 30 being moved in the fore-and-aft directions, and the distance between the respective LCD 25, 25 supported to the pair of LCD holders 24, 24 and the respective ocular lenses 22 of the pair of lens and mirror units 21, 21 are changed, and the adjustment of the position of the virtual image (diopter adjusting) is implemented.

During the diopter adjusting, the front and back position of each LCD 25 is determined by the position of the slide plate 32 of the backlight 30. However, the left and right displacement of each LCD 25 is limited by the recess 63c of each arm 63 to which the pin 24c of each LCD holder 24 is inserted. Each cam arm 63 is stopped without rotating around the pin 21d of each lens and mirror unit 21 after the pupil distance adjusting of the pair of lens and mirror units 21, 21. Accordingly, when the slide plate 32 is moved on the frame 4 in the fore-and-aft directions, the pin 24c of each LCD holder 24 which is received in a recess 63c of a cam arm 63, is moved in the recess 63c, in the manner shown in FIGS. 14A–14C. Due to the angle of each recess 63c, when the pair of LCD holders 24, 24 approach or depart from the pair of the lens and mirror units 21, 21, the LCD holders 24, 24 are also moved in the direction along each line OP, OP of the V-configuration shown in FIG. 25 and the convergence of the virtual image of each LCD 25 is adjusted.

Thus, the pupil distance adjustment of the pair of image generating means 20, 20 is easily and certainly implemented in a manner which simultaneously moves the pair of image generating means 20, 20 in the left and right directions toward and away from each other through the use of the pupil distance adjusting mechanism which is simply comprised of the pupil distance adjusting knob 8, the cam mechanism 40 and the link mechanism 50. Further, the diopter adjusting of the pair of image generating means 20, 20 is easily and certainly implemented by the diopter adjusting mechanism of a simple structure constituted by the diopter adjusting knob 9 and the cam mechanism 60. Furthermore, the above-mentioned each mechanism provides a simple arrangement for varying the diopter and the convergence adjustment while maintaining the adjusted condition of the pupil distance. Viz., the convergence adjustment is realized in that the pair of the left and right LCD 25, 25 are moved in a direction indicated by the lines OP, OP shown in FIG. 25, through the rotation of the diopter adjusting knob 9 after adjusting the distance between the pair of ocular lenses 22, 22 using the pupil distance adjusting knob 8.

During use of the above described device, the pair of headphones 74, 74 which are provided at the rear end sides of the pair of first bow portions 71, 71 are inserted into the wearer's ears after unreeling them from a pair of headphone receiving mechanisms 75, 75, and an image is generated on a display portion 25a of each LCD 25 in response to a signal from a portable video player or the like. The images are illuminated by the light from the fluorescent lamp 34 of the backlight 30. The light is directed in the form of parallel light which is reflected by the reflector 31 and which illuminates the display portion of each LCD 25. The illuminating light is reflected off the mirrors 23 and transmitted by each ocular lens 22. The image defined by the light transmitted through each ocular lens 22 is reflected at the half mirror 26 and thus directed to the left and right eyes A, A. Accordingly, the image is produced on each of the retinas after being expanded. At the same time the sound for the image becomes audible by means of each headphone 74.

As will be appreciated, the backlight 30 basically comprises the above-mentioned reflector 31 and fluorescent lamp 34, and is arranged such that the light from a single fluorescent lamp 34 illuminates the display portion 25a of each LCD of the pair of image generating means 20, 20 by way of a single reflector 31. Accordingly, any difference of color temperature and luminance between the left and right images reflected at the pair of LCDs 25, 25 is negated, and it becomes possible to produce images which have the same in color temperature and luminance in both the left and light units.

Further, as shown in FIGS. 15 and 16, since the electromagnetic shield plate 37 in the form of the sheet-shaped transparent electrode plate, is disposed between the reflector 31 of the backlight 30 and the LCD 25, it is possible to shield a high-voltage or high-frequency noise Z generated from the fluorescent lamp 34 (viz., a high-luminance high voltage high-frequency light source) while minimizing the loss of light transmission to each LCD 25. Furthermore, since the loss of the above-mentioned light transmission is kept to a minimum, it is possible to reduce electric energy consumption to a minimum. Furthermore, if a diffusion plate adding an electrically conductive treatment is used as the above-mentioned electromagnetic shield plate 37, it is possible to diffuse the transmitted light.

Further, although the fluorescent lamp 34 of the above-mentioned backlight 30 produces magnetic field W, since the reflector 31 is formed of a material comprising a resin into which an electrically conductive material is mixed, it is possible to effectively shield the magnetic field W generated from the above-mentioned fluorescent lamp 34 using the reflector 31 in the manner shown in FIG. 17, and therefore avoid any detrimental influence on the wearer. Also, since the reflector 31 itself is constructed by an electrically conductive material, it can be grounded through the use of an earth wire 38b and a metal screw 38c.

Furthermore, since the reflector itself is a conductor, it functions as a substitute for a near conductor necessary to smoothly start a turning-on of a cold-cathode lamp and a hot-cathode lamp of the fluorescent lamp 34 and the like. This near conductor effect promotes efficient starting or turning-on of the fluorescent lamp 34 and enables running costs to be lowered. Furthermore, since the electromagnetic shield plate 39 in the form of a sheet-shaped conductive plate is disposed between the above-mentioned reflector 31 and the rear portion 16a of the rear cabinet 16, any electromagnetic radiation W which leaks from the reflector 31 is shielded by the electromagnetic shield plate 39, and any detrimental effect by electromagnetic field on human organisms is prevented.

As shown in FIG. 3, since the backlight 30, the pair of LCD 25, 25, the pair of upper side reflection mirrors 23, 23, the pair of ocular lenses 22, 22 and the half mirror 26 are respectively disposed in the box-shaped housing 10 in a descending configuration, it is possible to reflect each image of each of the above-mentioned pair of LCD 25, 25 to a retina a of each eye A, through the half mirror 26, and in a manner which makes use of so-called vertical refraction. With this arrangement, the length light paths to the left and right eyes through the pair of image generating means 20, 20 is minimized, and it becomes possible to render the arrangement highly compact. This further minimizes the bulk of and lightens the housing 10.

As shown in FIGS. 1 and 4, since the laterally extending elongate transparent ocular window portion 17 is disposed at a lower side of the rear piece portion of the rear cabinet 16 and bridges the nose receiving portion 16g, it is possible to improve the image quality and to remove any unpleasant feeling of physical disorder by reducing the diffusion at the front of eye in a manner to reduce the viewable amount of the rear cabinet 17 in the vicinity of the image viewed through the half mirror 26. Furthermore, since the translucent viewing window portion 12 is disposed at a side of the front face 11a of the front cabinet 11 of the housing 10, it becomes possible to see the surroundings through the clearance between the half mirror 26 and the rear cabinet 16 while simultaneously seeing the image from the transparent ocular window portion 17 of the rear cabinet 16. Accordingly, in combination with the elongate formation of transparent ocular window portion 17 in the rear cabinet 16, the amount of a visual field of outside (outside view-field) of left and right and lower sides is maximized.

Furthermore, as shown in FIGS. 5 and 6, respective corner portions X, X and Y are cutout such that the both side piece portions 16c, 16c and the lower piece portion 16f of the rear cabinet 16 are inclined along the line of sight, the amount of the outside view-field which is screened, is minimized, and this enables the extended view field to be maximized. Thus, the obstruction such as a diffusing due to a so-called kick by the rear cabinet 16 is reduced, and this enables a user to concentrate on the image reflected by the half mirror 16.

Figure 26:
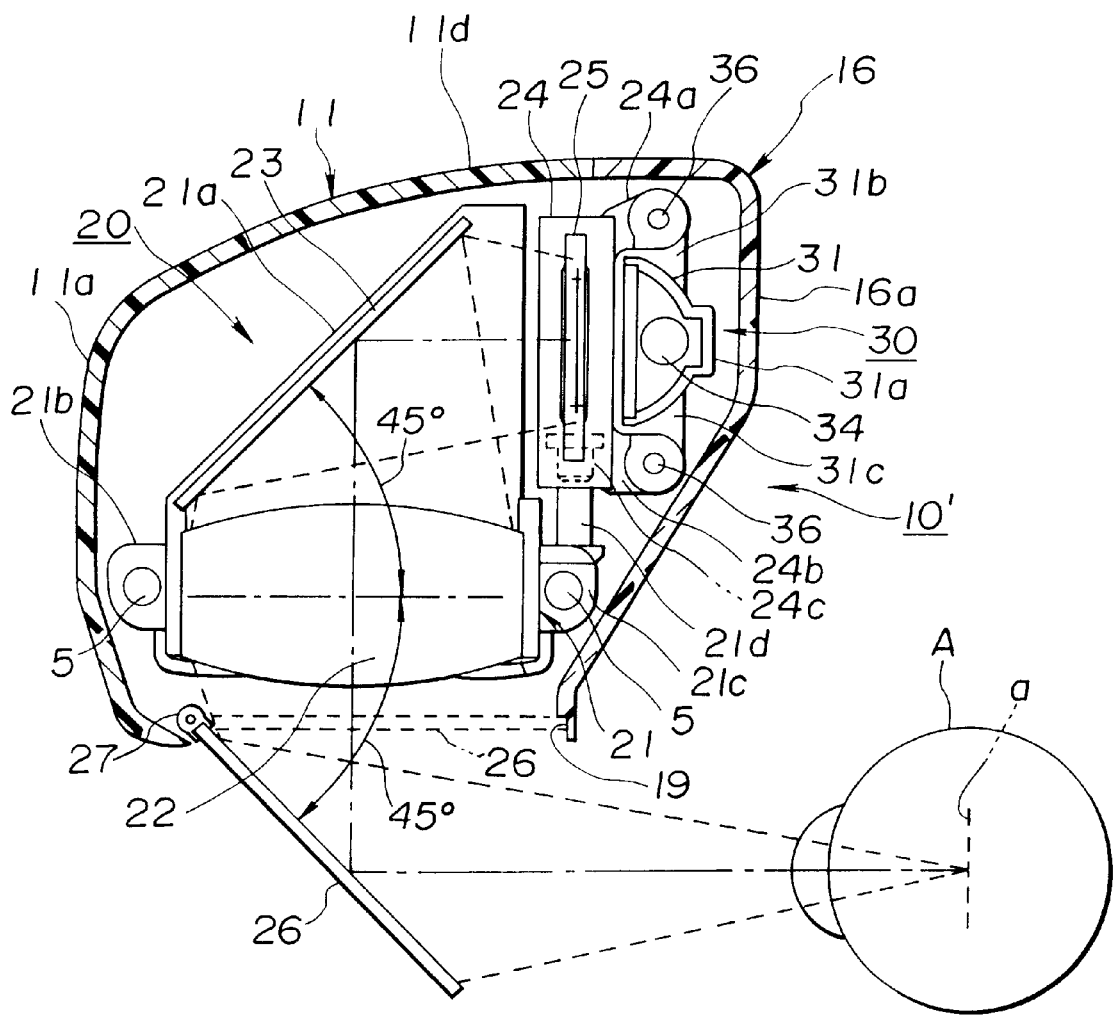
FIG. 26 is a vertical cross-sectional view of a spectacle type display device according to a second embodiment.
Figure 27:
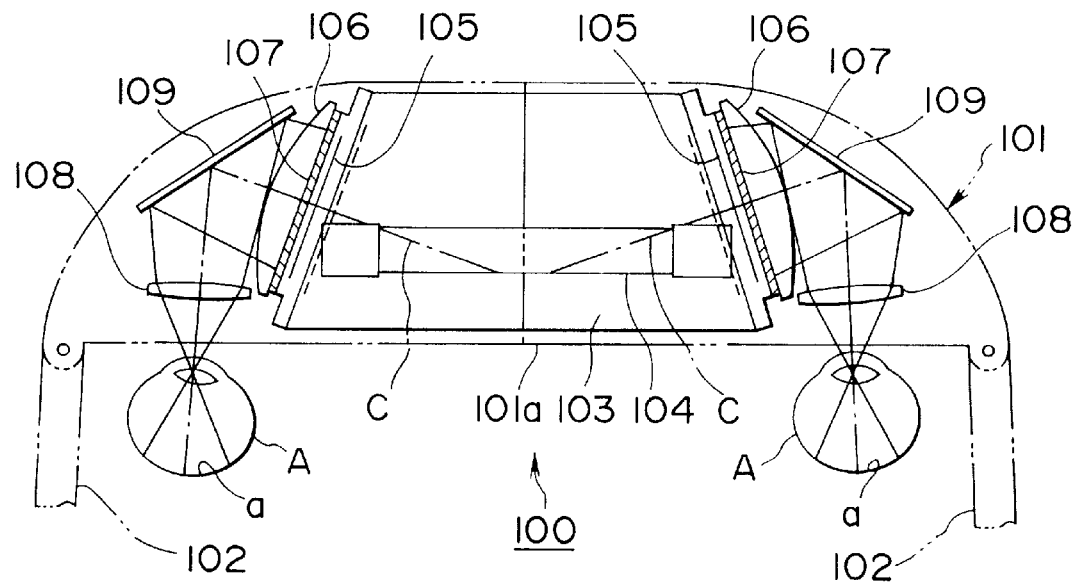
FIG. 27 is a schematic structural view of a previously proposed spectacle type display device discussed in the opening paragraphs of the disclosure.
Figure 28:
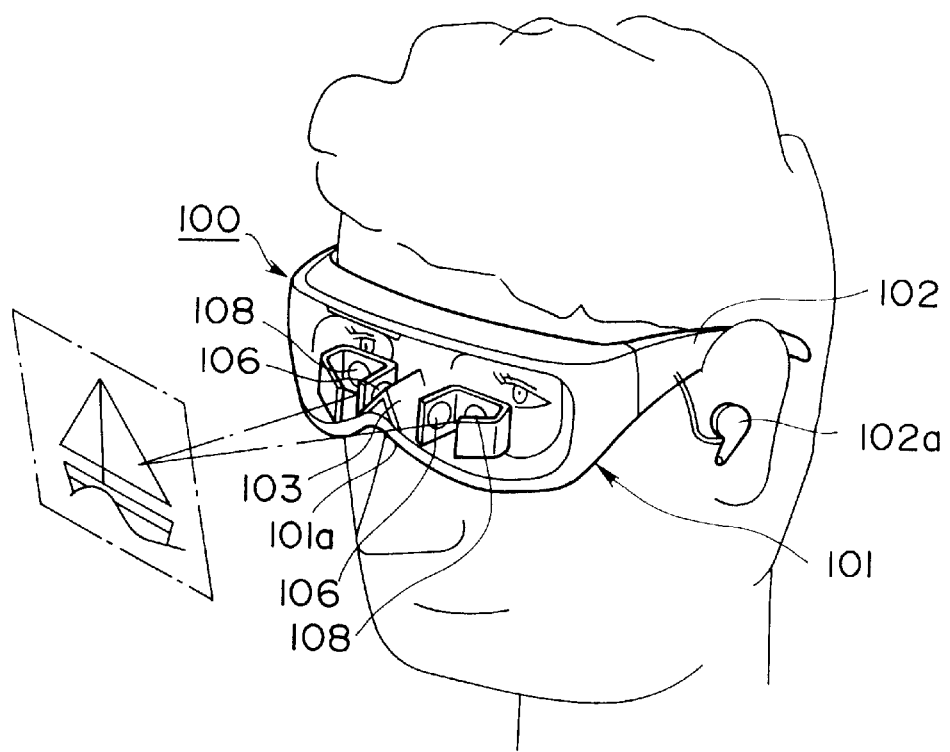
FIG. 28 is a perspective view depicting the spectacle type display device of FIG. 27, in use.

FIG. 26 shows the spectacle type display device accordingly to a second embodiment of the invention. Similar to the previous embodiment, the backlight 30, the pair of LCD 25, 25, the pair of upper side reflection mirrors 23, 23, the pair of ocular lenses 22, 22 and the half mirror 26 are disposed in the housing 10'. However, in this instance the half mirror 26 is arranged to pivotally mounted on a hinge 27 to as to be pivotal down from a position wherein it closes off the rectangular opening portion 19 opening to an operative position wherein the image passing through the ocular lenses 22, 22 is directed toward the retina a of the wearer's eyes. It should be noted that in this embodiment the half-mirror can be replaced with a fully reflective member. Since the other construction is the same as that of the above-mentioned embodiment, the same parts designate the same characters, and a detailed explanation thereof is omitted.

With this arrangement, it is also possible to reflect each image of each of the pair of LCD 25, 25 on the retina a of each eye A through the half mirror 26 by means of so-called vertical refraction, and to render the image generating means 20, 20 compact. Accordingly, the housing 10' becomes even smaller and lighter. Also, during an unused period, since the lower side reflection plate 26 can be rotated through the hinge 27 so as to close the opening portion 19 formed at a bottom side of the housing 101 as shown in FIG. 26, it is possible to possibly shorten the height of the housing 10'. Accordingly, the housing 10' similarly becomes further smaller and lighter. Furthermore, it is possible to receive the lower side reflection plate 26 in the opening portion 19 of the housing 10' periods of non-use. This is useful in preventing dust and other contaminating matter from entering the housing and soiling the pair of the ocular lenses 22 and 22.

According to the above-mentioned embodiment, although the pivotal tinted plate is disposed at a front face of the front cabinet of the housing as a means for reducing the ingress of external light, the light reducing means is not limited to such a tinted plate and may take the form of a liquid crystal shutter (liquid crystal plate) constituted by a polarization beam splitter and a polarization filter.

As mentioned above, according to the present invention, a spectacle type display device is arranged to transmit an image by way of a pair of image source means which are provided in a housing. In accordance with the present invention a pair of reflection plates and a pair of ocular lenses are arranged to project images produced by the source onto retinas of left and right eyes of the wearer.

A shaft is installed in the above-mentioned housing and supported on a frame. The image source means and the pair of lens and mirror units which include the reflection plates and the ocular lenses are arranged to be laterally movable in the left and right direction toward and away from each other along the shaft. The image source means and the pair of lens and mirror units are arranged to be relatively movable in the fore-and-aft direction toward and away from each other. Accordingly, it becomes possible to easily implement a diopter adjusting and a pupil distance adjustment of the above-mentioned optical visual unit.

Although only two embodiments of the present invention have been described above, the various variations and modifications which are possible without departing from the scope of the present invention, which is defined by the appended claims, will be self-evident to one skilled in the art to which the present invention pertains.

What is claimed is:

1. A spectacle type display device substantially enclosed in a housing and arranged to transmit images generated by a pair of image sources along a double folded optical path by way of a pair of image transfer units, each of which includes a reflection plate and an ocular lens, and a reflecting means positioned to receive images from the image transfer units and to project the images on retinas of the left and right eyes of a wearer, and which comprises:
   a first support and linkage means for supporting and linking said pair of image transfer units so as to be laterally movable toward and away from each other, said first support means including a rail on which said image transfer units are slidably supported, and
   second support means for supporting said pair of image sources for lateral movement toward and away from each other and cojointly for movement in a fore-and-aft direction relative to the reflection plates and the ocular lenses of said image transfer means.

2. A spectacle type display device as claimed in claim 1, further comprising a pupil distance adjusting knob which is rotatably disposed at one side of said housing, said image transfer units being operatively connected with said pupil distance adjusting knob through a cam mechanism and a link mechanism.

3. The spectacle type display apparatus according to claim 2 wherein said cam mechanism is directly connected to one of said image transfer units to effect lateral movement thereof and said link mechanism is rotatably supported between said pair of image transfer units whereby a lateral movement of said one image transfer unit results in a corresponding inverse lateral movement of the other of said image transfer means.

4. A spectacle type display device as claimed in claim 1, further comprising a diopter adjusting knob which is rotatably disposed at an upper side of said housing, each of said image sources being operatively connected with said diopter adjusting knob through a cam mechanism which is associated with a frame on which said image transfer units and said image sources are supported.

5. A spectacle type display device as claimed in claim 1, further comprising a backlight and wherein said reflecting means comprises a half-mirror which is supported in said housing at a level which is lower than the level at which said backlight is disposed, and wherein said a pair of reflection plates, and said pair of ocular lenses are vertically aligned between said image sources and said half-mirror, said housing having a transparent ocular window portion disposed at a rear side of said housing opposite a first side of said half-mirror, and a translucent viewing window disposed at a front side of said opposite housing a second side of said half-mirror.

6. The spectacle display device according to claim 1, wherein said second support means further comprises a slide plate, operably connected to said image transfer units and to said image source to move the image sources fore and aft in said housing relative to said image transfer units.

7. A spectacle type display apparatus comprising:
   a frame disposed in a body;
   a pair of image display means, disposed on said frame, for producing a pair of images in accordance with a video signal;
   a pair of reflection means for reflecting the pair of images produced by said pair of display means;
   a pair of lenses for focusing the pair of images reflected by said pair of reflection means;
   a first slide means for sliding said pair of lenses and said pair of reflection means laterally across said frame;
   a second slide means and support for sliding said pair of display means toward and away from said pair of lenses in the fore-and-aft direction of said frame; and
   a first operation means for adjusting a pupil distance by adjusting the relative distance between said pair of lenses, wherein said first slide means includes a cam and a link which are responsive to said first operation means.

8. A spectacle type display apparatus according to claim 7, wherein said cam is connected to a first of said pair of display means, wherein said link is connected between the first and a second of said pair of display means, and wherein said first operation means slides said pair of display means toward and away from each other.

9. A spectacle type display apparatus according to claim 7, wherein said first slide means moves said pair of reflection means and said pair of lenses simultaneously.

10. A spectacle type display apparatus comprising:
    a frame disposed in a body;
    a pair of image display means, disposed on said frame, for producing a pair of images in accordance with a video signal;
    a pair of reflection means for reflecting the pair of images produced by said pair of display means;
    a pair of lenses for focusing the pair of images reflected by said pair of reflection means;
    a first slide means for sliding said pair of lenses and said pair of reflection means laterally across said frame;
    a second slide means and support for sliding said pair of display means toward and away from said pair of lenses in the fore-and-aft direction of said frame; and
    a second operation means for adjusting a focus distance by adjusting the distance between said pair of image sources and said pair of reflection means, and wherein said second slide means includes a cam mechanism which is responsive to the operation of said second operation means.

11. A spectacle type display apparatus according to claim 10, wherein said cam mechanism has an eccentric cam plate and a slide plate in engagement with said cam plate, said second operation means respectively moving said pair of image sources.

12. A spectacle type display apparatus comprising:
    a frame disposed in a body;
    a pair of image display means, disposed on said frame, for producing a pair of images in accordance with a video signal;
    a pair of reflection means for reflecting the pair of images produced by said pair of display means;
    a pair of lenses for focusing the pair of images reflected by said pair of reflection means;
    a first slide means for sliding said pair of lenses and said pair of reflection means laterally across said frame;
    a second slide means and support for sliding said pair of display means toward and away from said pair of lenses in the fore-and-aft direction of said frame; and
    a first operation means for adjusting a pupil distance of said display means and a second operation means for adjusting a focus distance of said display means,
    wherein said first slide means includes a cam and a link which are operatively responsive to the operation of said first operation means, said second slide means including a cam mechanism which is operatively responsive to the operation of said second operation means.

13. A spectacle type display apparatus according to claim 12, wherein said cam is connected to a first of said image sources, the first and a second of said image sources being connected by said link, said cam mechanism having an eccentric cam plate and a slide plate engaging said eccentric cam plate.

14. A spectacle type display apparatus according to claim 13, further comprising:
  a backlight and a half mirror being disposed in said body in a vertically displaced arrangement;
  a transparent window disposed at a rear side of said body opposite said half mirror; and
  a translucent viewing window being disposed at a front side of said body opposite said half mirror.

15. Apparatus for use in a spectacle type display, comprising:
  a frame;
  first and second image sources supported on said frame so as to be reciprocally moveable toward and away from each other in a first direction across said frame, and synchronously movable in a second direction which is essentially normal to said first direction;
  a first mirror supported on said frame so as to be in a predetermined relationship with said first image source, said first mirror being moveable in said first direction across said frame;
  a first lens supported on said frame in a predetermined relationship with said first mirror, said first lens being connected with said first mirror so as to be synchronously movable therewith in said first direction;
  a second mirror supported on said frame so as to be in a predetermined relationship with said second image source, said second mirror being moveable in said first direction with respect to said frame and reciprocally moveable toward and away from said first mirror;
  a second lens supported on said frame in a predetermined relationship with said second mirror, said second lens being connected with said second mirror so as to be synchronously movable therewith in said first direction;
  first adjustment means for selectively moving said first and second mirrors in said first direction and so that the relative distance between said first and second mirrors changes; and
  second adjustment means for moving said first and second image sources in said second direction and in a manner which changes the relative distance between said first and second image sources and said first and second mirrors, respectively, and for simultaneously moving said first and second image sources in said first direction in a manner which changes the relative distance therebetween in response to the movement of said first and second images sources in said second direction.

16. A method of operating a spectacle type display comprising the steps of:
  producing a first image using a first image source;
  reflecting the first image using a first mirror;
  focusing the first image using a first lens;
  reflecting the focused first image toward a first predetermined eye position;
  producing a second image using a second image source;
  reflecting the second image using a second mirror;
  focusing the second image using a second lens;
  reflecting the focused second image toward a second predetermined eye position;
  moving said first mirror and said first lens and said second mirror and said second lens as first and second units respectively, in a first direction which changes the relative distance between the two units to thereby effect a pupil distance adjustment;
  moving said first and second image sources in a direction which changes the relative distance between said first and second image sources and said first and second mirrors respectively and simultaneously moving said first and second image sources with respect to one another in a manner which changes the relative distance therebetween to thereby effect a diopter adjustment.

17. Apparatus for use in a spectacle type display, comprising:
  means for producing a first image;
  means for reflecting the first image;
  means for focusing the reflected first image;
  means for reflecting the focused first image toward a first predetermined eye position;
  means for producing a second image;
  means for reflecting the second image;
  means for focusing the second image;
  means for reflecting the focused second image toward a second eye position;
  means for moving said first mirror and said first lens and said second mirror and said second lens as first and second units respectively, in a first direction which changes the relative distance between the two units;
  first means for moving said first image and second image sources in a direction which changes the relative distance between said first and second image sources and said first and second mirrors respectively; and
  second means, responsive to said first means, for simultaneously moving said first and second image sources with respect to one another and in a manner which changes the relative distance therebetween.

* * * * *